(12) United States Patent
Sakuma et al.

(10) Patent No.: US 9,820,337 B2
(45) Date of Patent: Nov. 14, 2017

(54) HEATING METHOD OF HONEYCOMB STRUCTURE

(71) Applicant: NGK Insulators, Ltd., Nagoya (JP)

(72) Inventors: Takeshi Sakuma, Nagoya (JP); Katsumi Saiki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 356 days.

(21) Appl. No.: 14/496,618

(22) Filed: Sep. 25, 2014

(65) Prior Publication Data

US 2015/0014292 A1 Jan. 15, 2015

Related U.S. Application Data

(63) Continuation of application No. PCT/JP2013/059774, filed on Mar. 29, 2013.

(30) Foreign Application Priority Data

Mar. 30, 2012 (JP) .................. 2012-083099

(51) Int. Cl.
*H05B 3/00* (2006.01)
*F01N 9/00* (2006.01)
(Continued)

(52) U.S. Cl.
CPC ......... *H05B 3/0004* (2013.01); *F01N 3/2026* (2013.01); *F01N 9/00* (2013.01);
(Continued)

(58) Field of Classification Search
CPC ............................................ H05B 2203/019
See application file for complete search history.

(56) References Cited

U.S. PATENT DOCUMENTS 4,415,800 A * 11/1983 Dodge ................ G03G 15/205
219/216
5,063,029 A 11/1991 Mizuno et al.
(Continued)

FOREIGN PATENT DOCUMENTS

JP 08-141408 A1 6/1996
JP 09-079029 A1 3/1997
(Continued)

OTHER PUBLICATIONS

European Office Action (Application No. 13770336.9) dated Mar. 18, 2016.
(Continued)

*Primary Examiner* — David Angwin
*Assistant Examiner* — John J Norton
(74) *Attorney, Agent, or Firm* — Burr & Brown, PLLC

(57) ABSTRACT

The heating method of honeycomb structure includes a heating step of supplying a power to a honeycomb structure body of a honeycomb structure including the tubular honeycomb structure body having porous partition walls to define and form a plurality of cells and a circumferential wall positioned at an outermost circumference, and heating by electricity conduction, and a catalyst loaded onto the partition walls of the honeycomb structure body, to heat the honeycomb structure body up to a target temperature, and in the heating step, there is provided, at least once, a supply power decrease section where the supply of the power to the honeycomb structure body is stopped or the power to be supplied to the honeycomb structure body is decreased before the lowest temperature in a heating region of the honeycomb structure body reaches the target temperature.

19 Claims, 9 Drawing Sheets

(51) Int. Cl.
*F01N 3/20* (2006.01)
*B01J 35/04* (2006.01)
*B29D 99/00* (2010.01)
*B29L 22/00* (2006.01)

(52) U.S. Cl.
CPC ........... *B01J 35/04* (2013.01); *B29D 99/0089* (2013.01); *B29L 2022/007* (2013.01); *Y02T 10/26* (2013.01); *Y02T 10/47* (2013.01)

(56) References Cited

U.S. PATENT DOCUMENTS

| | | | |
|---|---|---|---|
| 5,288,975 A | | 2/1994 | Kondo |
| 5,412,453 A | * | 5/1995 | Matsuo ................ G03G 15/205 399/33 |
| 5,444,978 A | | 8/1995 | Yoshizaki et al. |
| RE35,134 E | | 12/1995 | Mizuno et al. |
| 5,708,920 A | * | 1/1998 | Ohnishi ............. G03G 15/2039 399/69 |
| 5,845,492 A | * | 12/1998 | Isobe ........................ F01N 3/22 60/284 |
| 5,904,902 A | * | 5/1999 | Matuoka .................. F01N 3/20 422/174 |
| 5,908,019 A | * | 6/1999 | Fukuchi ................ F01N 3/2013 123/339.18 |
| 6,052,988 A | | 4/2000 | Ikeda |
| 6,114,671 A | * | 9/2000 | Wehner ............. G05D 23/1934 219/483 |
| 6,124,577 A | * | 9/2000 | Fristedt .................. A47C 7/748 219/202 |
| 6,965,741 B2 | * | 11/2005 | Senda ................ G03G 15/2042 399/33 |
| 2003/0134084 A1 | | 7/2003 | Ichikawa et al. |
| 2011/0268613 A1 | | 11/2011 | Hirai et al. |
| 2013/0043237 A1 | | 2/2013 | Sakashita et al. |

FOREIGN PATENT DOCUMENTS

| | | |
|---|---|---|
| JP | 2931362 B2 | 8/1999 |
| JP | 4136319 B2 | 8/2008 |
| JP | 2010-229978 A1 | 10/2010 |
| JP | 2011-231708 A1 | 11/2011 |
| JP | 2012-163058 A1 | 8/2012 |
| WO | 2011/125817 A1 | 10/2011 |

OTHER PUBLICATIONS

Extended European Search Report (Application No. 13770336.9) dated Jul. 20, 2015.
International Search Report and Written Opinion (Application No. PCT/JP2013/059774) dated Jun. 25, 2013.

* cited by examiner

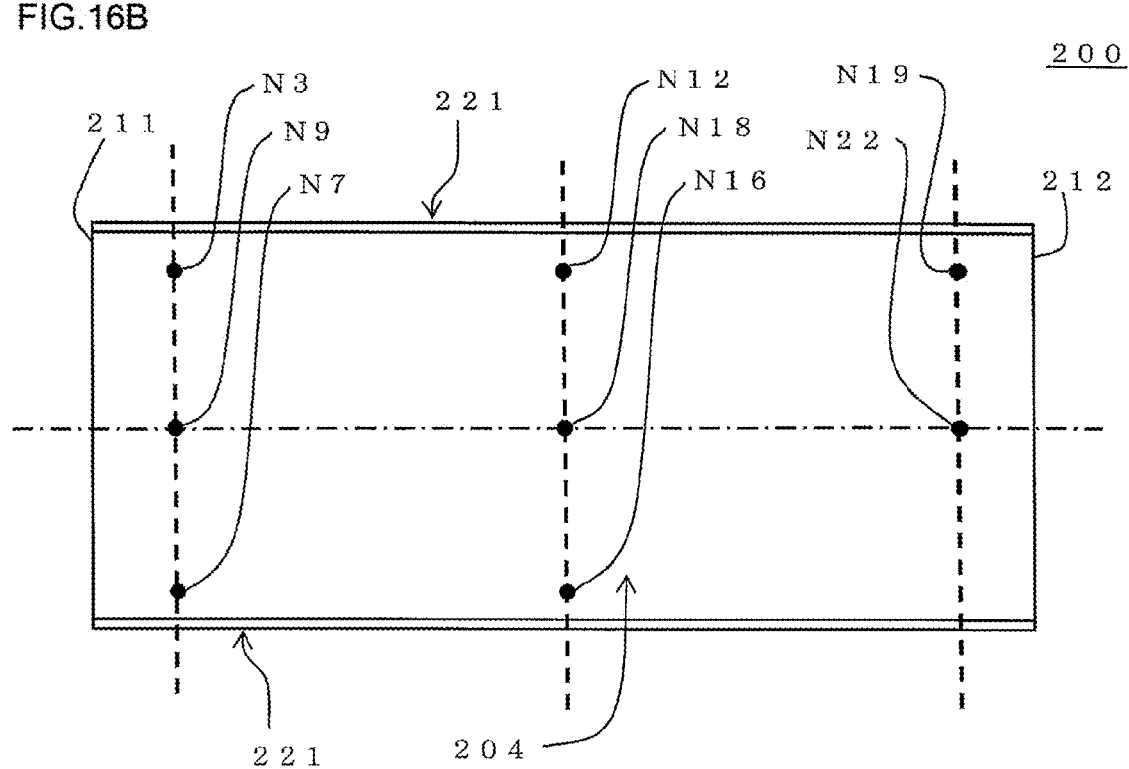

HEATING METHOD OF HONEYCOMB STRUCTURE

BACKGROUND OF THE INVENTION

Field of the Invention

The present invention relates to a heating method of honeycomb structure. More particularly, it relates to a heating method of honeycomb structure in which it is possible to suitably heat the honeycomb structure with less temperature unevenness during the heating and with less power consumption.

Description of Related Art

Heretofore, honeycomb structures made of cordierite and onto which catalyst is loaded have been used in treatment of harmful substance in exhaust gas discharged from car engines. Furthermore, it is also known that honeycomb structures formed by silicon carbide sintered body are for use in purification of exhaust gas (e.g., see Patent Document 1).

When the harmful substance included in the exhaust gas is to be treated by the catalyst, it is necessary to raise a temperature of the catalyst up to a predetermined temperature. That is, for effectively developing a catalytic function of the catalyst, it is necessary to raise the temperature of the catalyst up to such a temperature as to activate the catalyst or more. However, at the start of an engine, the temperature of the catalyst is low, and hence there has been the problem that the exhaust gas is not sufficiently purified.

To solve the problem, there has been investigated a method of disposing a heater made of a metal on an upstream side of a honeycomb structure onto which a catalyst is loaded, to raise a temperature of an exhaust gas (e.g., see Patent Document 2).

Furthermore, it has been disclosed that a honeycomb structure which is made of a conductive ceramic material and in which electrodes are disposed in both end portions is used as a catalyst carrier with a heater (e.g., see Patent Document 3).

Furthermore, there has been disclosed a honeycomb structure including a tubular honeycomb structure body having porous partition walls and a circumferential wall positioned at an outermost circumference, and a pair of electrode members disposed on a side surface of the honeycomb structure body (e.g., Patent Document 4). In the honeycomb structure described in Patent Document 4, an electrical resistivity of the honeycomb structure body is from 1 to 200 $\Omega$cm. A voltage is applied between the pair of electrode members of this honeycomb structure to supply a power to the honeycomb structure body, so that the honeycomb structure body can be heated. That is, such a honeycomb structure is a catalyst carrier which also functions as a heater, when the voltage is applied.

As described above, when the exhaust gas is treated by the catalyst loaded onto the honeycomb structure, it is necessary to raise the temperature of the catalyst up to a predetermined temperature. Therefore, when the honeycomb structure onto which the catalyst is loaded as described in Patent Document 4 is used in the treatment of the harmful substance in the exhaust gas, the temperature of the honeycomb structure body has been raised up to a temperature at which the loaded catalyst is activated or more. Hereinafter, the "temperature at which the catalyst is activated" may be referred to as "catalyst activating temperature".

CITATION LIST

Patent Documents

[Patent Document 1] JP 4136319
[Patent Document 2] JP 2931362
[Patent Document 3] JP-A-H08-141408
[Patent Document 4] WO 2011/125817

SUMMARY OF THE INVENTION

Problem to be Solved by the Invention

When a catalyst is loaded onto such a honeycomb structure as described in Patent Document 4 to treat an exhaust gas, a honeycomb structure body has to be rapidly heated in time for the start of an engine of a car. Particularly in a hybrid car having a power source other than the engine, start and stop of the engine are frequently performed, and hence it is necessary to rapidly heat the honeycomb structure body in accordance with the start of the engine. Furthermore, also in a usual gasoline engine car or the like, it is necessary to rapidly heat the honeycomb structure body in accordance with the start of the engine in a running state where the start and stop of the engine are frequently performed.

Therefore, a method of supplying a constant power to the honeycomb structure body for a predetermined time has heretofore been employed as the method of heating the honeycomb structure body of the honeycomb structure described in Patent Document 4. In such a heating method of honeycomb structure, a comparatively large power is supplied to the honeycomb structure body for the predetermined time to heat the honeycomb structure body at a breath until the lowest temperature in a heating portion of the honeycomb structure body reaches a catalyst activating temperature or more. Hereinafter, the method of heating the honeycomb structure in this manner will be referred to as "conventional heating method of honeycomb structure". It is to be noted that the reason why the honeycomb structure body is heated by using the lowest temperature in the heating portion as a reference is that a suitable purification capability (in other words, a catalytic function) is developed in the whole honeycomb structure body.

However, in the abovementioned conventional heating method of honeycomb structure, there has been the problem that it is remarkably difficult to uniformly heat the honeycomb structure body. In particular, a resistance value of the honeycomb structure body lowers with a temperature rise, and hence the heating of a portion where the temperature is high is further promoted. Therefore, in the conventional heating method of honeycomb structure, a partial temperature difference of the honeycomb structure body enlarges with the temperature rise, and a temperature difference between the highest temperature and the lowest temperature at a point of time when a target temperature is reached may disadvantageously and noticeably be increased sometimes.

In a case where the exhaust gas is purified, the purification capability is sufficiently developed when the catalyst has reached a desirable temperature or more. An example of the abovementioned desirable temperature is the catalyst activating temperature. However, in a case where the honeycomb structure body is heated, the honeycomb structure body is excessively heated in excess of the catalyst activating temperature, which is unfavorable from the viewpoint of power consumption. For example, when the lowest temperature in the heating portion reaches the catalyst activating temperature and the highest temperature in the heating portion is noticeably higher than the catalyst activating temperature, the power is disadvantageously and wastefully consumed for the heating of the honeycomb structure body. Particularly, in the car or the like, the heating of the honeycomb structure body is performed by using a power source such as a battery, and hence it is important to suitably heat the honeycomb structure body by effectively using a limited power.

The present invention has been developed in view of the abovementioned problems, and there is provided a heating method of honeycomb structure in which it is possible to suitably heat the honeycomb structure with less temperature unevenness during the heating and with less power consumption.

Means for Solving the Problem

To solve the abovementioned problems, according to the present invention, there is provided a heating method of a honeycomb structure in the following.

According to a first aspect of the present invention, a heating method of a honeycomb structure is provided, the honeycomb structure including a tubular honeycomb structure body which has porous partition walls to define and form a plurality of cells which become through channels for a fluid and extend from a first end face to a second end face and a circumferential wall positioned at an outermost circumference, and which is heated by electricity conduction, and a catalyst loaded onto the partition walls of the honeycomb structure body, the method including a heating step of supplying a power to the honeycomb structure body of the honeycomb structure to heat the honeycomb structure body up to a target temperature, wherein in the heating step, there is provided, at least once, a supply power decrease section where the supply of the power to the honeycomb structure body is stopped or the power to be supplied to the honeycomb structure body is decreased before the lowest temperature in a heating region of the honeycomb structure body reaches the target temperature.

According to a second aspect of the present invention, the heating method of the honeycomb structure according to the above first aspect is provided, wherein in the heating step, after the supply power decrease section, there is provided a supply power return section where the supply of the power to the honeycomb structure body is restarted or the power to be supplied to the honeycomb structure body is increased from a decreased state.

According to a third aspect of the present invention, the heating method of the honeycomb structure according to the above first or second aspect is provided, wherein in the heating step, the honeycomb structure body is heated until the lowest temperature in the heating region of the honeycomb structure body becomes 100° C. or more.

According to a fourth aspect of the present invention, the heating method of the honeycomb structure according to any one of the above first to third aspects is provided, wherein in the heating step, the honeycomb structure body is heated so that the highest temperature in the heating region of the honeycomb structure body does not exceed 1000° C.

According to a fifth aspect of the present invention, the heating method of the honeycomb structure according to any one of the above first to fourth aspects is provided, wherein in the heating step, a difference between the highest temperature and the lowest temperature in the heating region of the honeycomb structure body is 900° C. or less.

According to a sixth aspect of the present invention, the heating method of the honeycomb structure according to any one of the above first to fifth aspects is provided, wherein the honeycomb structure further includes two or more electrode members disposed on a side surface of the honeycomb structure body.

According to a seventh aspect of the present invention, the heating method of the honeycomb structure according to any one of the above first to sixth aspects is provided, wherein in the heating step, the supply power decrease section is provided in a state where at least the highest temperature in the heating region of the honeycomb structure body is a temperature which is not less than the target temperature.

According to an eighth aspect of the present invention, the heating method of the honeycomb structure according to any one of the above first to seventh aspects is provided, wherein in the supply power decrease section, the highest temperature in the heating region of the honeycomb structure body lowers with an elapse of time.

Effect of the Invention

In a heating method of honeycomb structure of the present invention, the abovementioned supply power decrease section is provided at least once before the lowest temperature in a heating region of a honeycomb structure body reaches a target temperature. According to such a heating method of honeycomb structure of the present invention, it is possible to decrease a difference between the highest temperature and the lowest temperature of the honeycomb structure at a heating step end time point when the honeycomb structure body is heated up to the target temperature. In consequence, as compared with a case where the honeycomb structure is heated by a conventional method, there is produced an effect that a partial temperature difference of the honeycomb structure can be decreased (i.e., the lowest temperature can further be raised close to the highest temperature) at the point of time when the heating step is ended. Furthermore, as described above, the temperature difference at the point of time when the heating step is ended can be decreased, and hence there is also produced an effect that less power is required for the heating as compared with a case where the honeycomb structure is heated by the conventional method so that the lowest temperature reaches the same temperature. Furthermore, as compared with the case where the honeycomb structure is heated by the conventional method so that the lowest temperature reaches the same temperature, the highest temperature becomes lower, and hence eventually, the temperature difference of the honeycomb structure can further be decreased.

BRIEF DESCRIPTION OF THE DRAWINGS

FIG. 16B is a sectional view showing a cross section cut along the A-A line of FIG. 16A.

DETAILED DESCRIPTION OF THE INVENTION

Next, a mode for carrying out the present invention will be described in detail with reference to the drawings. It should be understood that the present invention is not limited to the following embodiment and that a change, an improvement or the like of design is suitably added on the basis of ordinary knowledge of a person skilled in the art without departing from the gist of the present invention.

Figure 1:
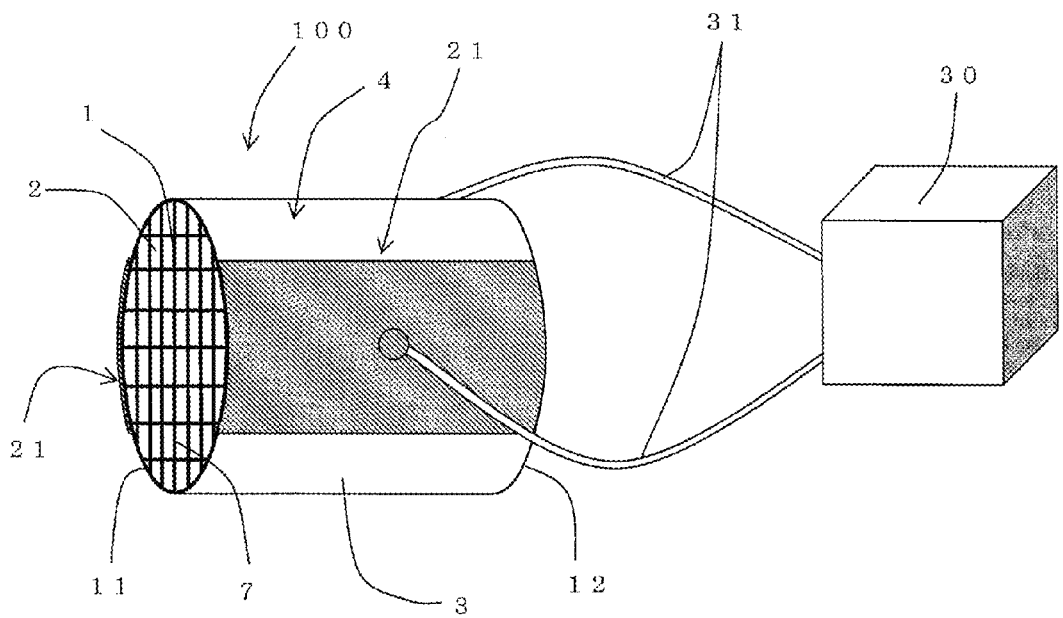
FIG. 1 is a schematic view to explain a heating step of one embodiment of heating method of honeycomb structure of the present invention.

(1) Heating Method of Honeycomb Structure:

One embodiment of a heating method of honeycomb structure of the present invention is a heating method of honeycomb structure which is to be performed by using such a honeycomb structure 100 as shown in FIG. 1. The honeycomb structure 100 shown in FIG. 1 includes a tubular honeycomb structure body 4 which is heated by electricity conduction, and a catalyst 7 loaded onto partition walls 1 of the honeycomb structure body 4. The honeycomb structure body 4 has the porous partition walls 1 and a circumferential wall 3 positioned at an outermost circumference. The porous partition walls 1 define and form a plurality of cells 2 which become through channels for a fluid and extend from a first end face 11 which is one end face to a second end face 12 which is the other end face.

Figure 2:
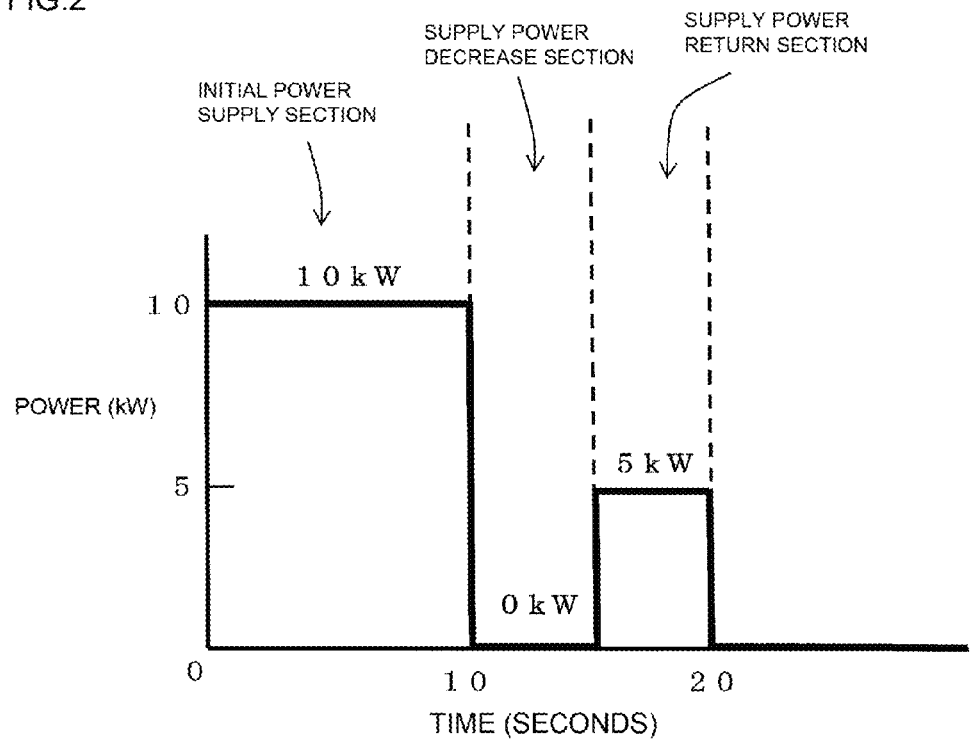
FIG. 2 is a graph showing one example of relation between power (kW) to be supplied to a honeycomb structure body and elapsed time (seconds) of the heating step, in the heating step of the one embodiment of the heating method of honeycomb structure of the present invention.
Figure 3:
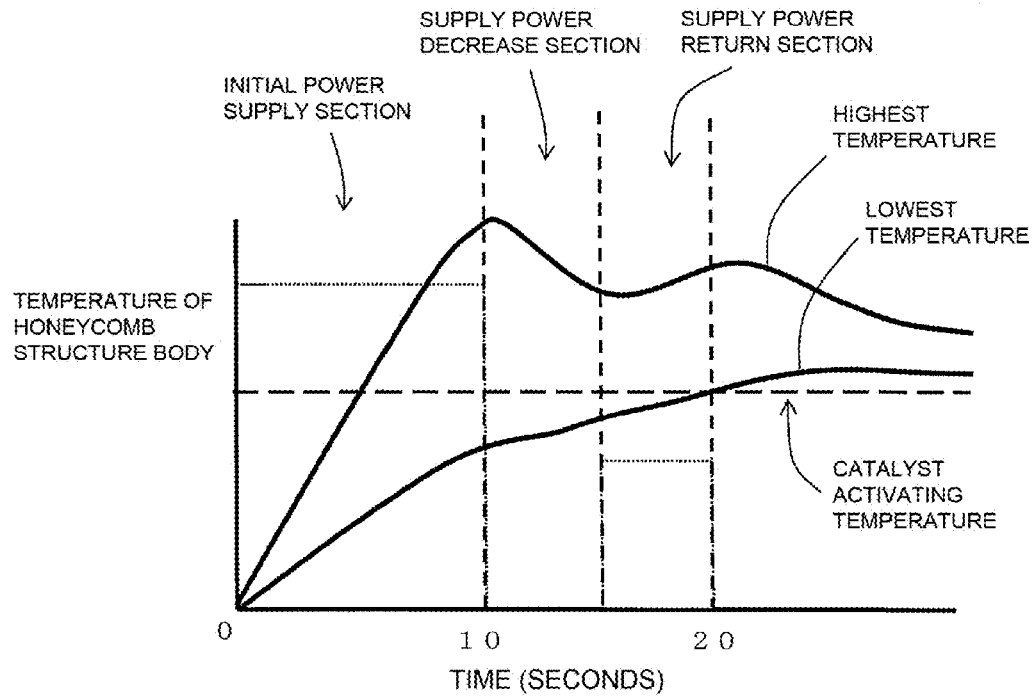
FIG. 3 is a graph showing one example of relation between temperature of the honeycomb structure body and elapsed time (seconds) of the heating step, in the heating step of the one embodiment of the heating method of honeycomb structure of the present invention.

Here, FIG. 1 is a schematic view to explain a heating step of the one embodiment of the heating method of honeycomb structure of the present invention. Furthermore, FIG. 2 is a graph showing one example of relation between power (kW) to be supplied to the honeycomb structure body and elapsed time (seconds) of the heating step, in the heating step of the one embodiment of the heating method of honeycomb structure of the present invention. In the graph shown in FIG. 2, the abscissa indicates the elapsed time (seconds) of the heating step, and the ordinate indicates the power (kW) to be supplied to the honeycomb structure body. Furthermore, FIG. 3 is a graph showing one example of relation between temperature of the honeycomb structure body and elapsed time (seconds) of the heating step, in the heating step of the one embodiment of the heating method of honeycomb structure of the present invention. In the graph shown in FIG. 3, the abscissa indicates the elapsed time (seconds) of the heating step, and the ordinate indicates the temperature of the honeycomb structure body. In FIG. 3, the temperature of the honeycomb structure body rises upwardly along the ordinate. The graph shown in FIG. 3 is a graph showing the temperature change of the honeycomb structure body, when the power is supplied to the honeycomb structure body as in the graph shown in FIG. 2. FIG. 3 shows two temperature changes of the highest temperature and the lowest temperature in a heating portion of the honeycomb structure body. Numeric values of the power (kW) and the time (seconds) shown in FIG. 2 indicate one example of the heating step, and the numeric values of each power (kW) and time (seconds) do not limit the heating step of the heating method of honeycomb structure of the present embodiment.

The heating method of honeycomb structure of the present embodiment includes the heating step of supplying power to the honeycomb structure body 4 of the honeycomb structure 100 to heat the honeycomb structure body 4 up to a target temperature as shown in FIG. 1. The honeycomb structure 100 shown in FIG. 1 further includes two electrode members 21, 21 disposed on a side surface 5 of the honeycomb structure body 4. In the heating method of honeycomb structure of the present embodiment, these two electrode members 21, 21 are connected to wiring lines 31, 31, respectively. Furthermore, the wiring lines 31, 31 are electrically connected to a power source 30 to supply the power to the honeycomb structure body 4. It is to be noted that the electrode member 21 disposed on the side surface 5 of the honeycomb structure body 4 is not limited to such a constitution as shown in FIG. 1. Furthermore, the number of the electrode members 21 to be disposed on the side surface 5 of the honeycomb structure body 4 is not limited to two.

There is not any special restriction on the electrode member 21 as long as it is possible to heat the honeycomb structure body 4 by supplying power to the honeycomb structure body 4.

In the heating method of honeycomb structure of the present embodiment, in the abovementioned heating step, such a "supply power decrease section" as described in the following is provided at least once before the lowest temperature in a heating region of the honeycomb structure body 4 reaches the abovementioned target temperature. The "supply power decrease section" is a section where the supply of the power to the honeycomb structure body 4 is stopped or the power to be supplied to the honeycomb structure body 4 is decreased. More specifically, in the heating method of honeycomb structure of the present embodiment, first, the power is supplied from the power source 30 to the honeycomb structure body 4 to heat the honeycomb structure body 4. An "initial power supply period" in FIG. 2 corresponds to this supply of the power. In this way, the honeycomb structure body is heated, and the temperature of the honeycomb structure body thereby rises. Here, the supply of the power to the honeycomb structure body is stopped for a predetermined period or the power to be supplied to the honeycomb structure body is decreased for a predetermined period before the lowest temperature in the heating region of the honeycomb structure body reaches the target temperature (the supply power decrease section). In FIG. 2, this supply power decrease section is provided between ten seconds and 15 seconds of the elapsed time of the heating step. In FIG. 2, in this supply power decrease section, the supply of the power to the honeycomb structure body is stopped for the predetermined period. That is, in FIG. 2, the power in the supply power decrease section is 0 kW. The "target temperature" in the heating method of honeycomb structure of the present embodiment is a temperature to be reached by the honeycomb structure body 4, when the power is supplied to the honeycomb structure body 4 to heat the honeycomb structure body as shown in FIG. 1. Therefore, in the heating method of honeycomb structure of the present embodiment, the heating is performed so that the whole range of the heating region of the honeycomb structure body 4 finally becomes the abovementioned target temperature or more. Such "target temperature" can suitably be set in accordance with a use purpose of the honeycomb structure 100. Therefore, there is not any special restriction on a specific value of the target temperature. The target temperature is preferably, for example, from 100 to 300° C.

Figure 4:
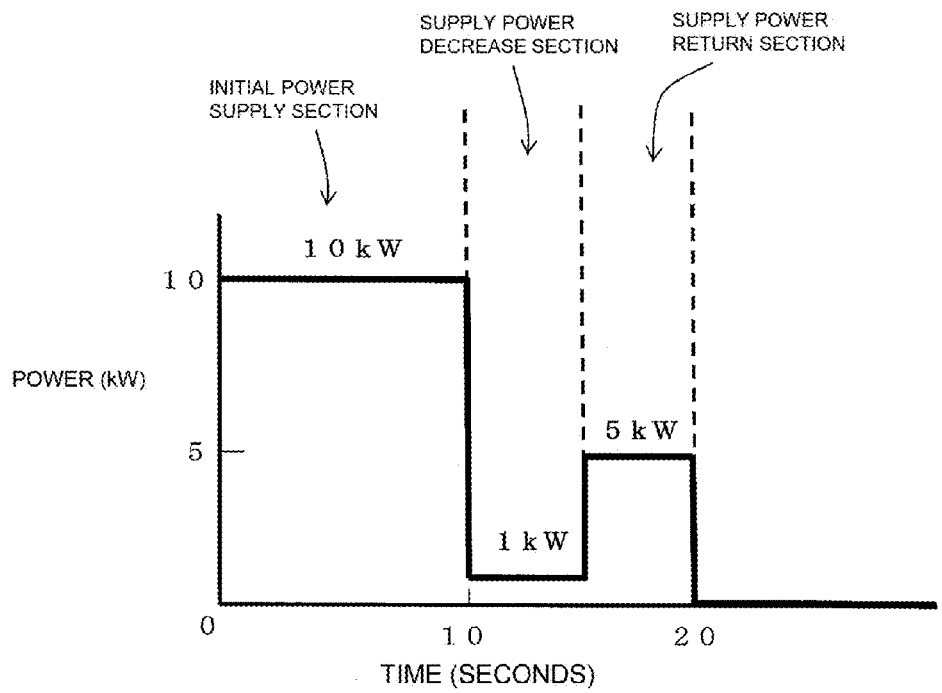
FIG. 4 is a graph showing another example of relation between power (kW) to be supplied to the honeycomb structure body and elapsed time (seconds) of the heating step, in the heating step of the one embodiment of the heating method of honeycomb structure of the present invention.

There is not any special restriction on the heating method of honeycomb structure of the present embodiment, as long as the value of the power in this supply power decrease section is lower than the value of the power in the initial power supply period. For example, as shown in FIG. 4, the power to be supplied to the honeycomb structure body 4 may be decreased for a predetermined period in the supply power decrease section. FIG. 4 is a graph showing another example of relation between power (kW) to be supplied to the honeycomb structure body and elapsed time (seconds) of the heating step, in the heating step of the one embodiment of the heating method of honeycomb structure of the present invention. FIG. 4 shows the example where the same power as in the heating step shown in FIG. 2 is supplied to the honeycomb structure body, except that the power in the supply power decrease section is changed to 1 kW.

When such a supply power decrease section is provided, the honeycomb structure (more specifically, the honeycomb structure body) can suitably be heated with less temperature unevenness during the heating and with less power consumption. That is, in the heating method of honeycomb structure of the present embodiment, the abovementioned supply power decrease section is provided at least once before the lowest temperature in the heating region of the honeycomb structure body reaches the target temperature. Therefore, in the supply power decrease section, heat conduction is performed from a portion of the honeycomb structure body in which the temperature is high to a portion of the honeycomb structure body in which the temperature is low, and the temperature unevenness in the heating (in other words, a temperature difference) becomes smaller. For example, as shown in FIG. 3, in the supply power decrease section, the highest temperature of the honeycomb structure body lowers with an elapse of time, but the lowest temperature of the honeycomb structure body rises with the elapse of time. In consequence, the temperature difference of the honeycomb structure body can be decreased in the subsequent heating step. In the heating method of honeycomb structure of the present embodiment, the difference between the highest temperature and the lowest temperature in the heating region of the honeycomb structure body preferably becomes smaller in the supply power decrease section.

As described above, according to the heating method of honeycomb structure of the present embodiment, the difference between the highest temperature and the lowest temperature of the honeycomb structure can be decreased at the end time point of the heating step wherein the honeycomb structure body is heated up to the target temperature. In consequence, there is produced an effect that a partial temperature difference of the honeycomb structure can be decreased (i.e., the lowest temperature is further raised close to the highest temperature) at a point of time when the heating step is ended, as compared with a case where the honeycomb structure is heated by the conventional method. Furthermore, as described above, the temperature difference at the point of time when the heating step is ended can be decreased, and hence an effect that less power is required for the heating is also produced, as compared with a case where the heating is performed by the conventional method so that the lowest temperature reaches the same temperature. Furthermore, as compared with the case where the heating is performed by the conventional method so that the lowest temperature reaches the same temperature, the highest temperature becomes lower, and hence eventually, the temperature difference of the honeycomb structure can further be decreased.

Furthermore, in accordance with a timing to provide the supply power decrease section, it is possible to decrease a maximum temperature difference between the highest temperature and the lowest temperature not only at the heating step end time point but also during the heating step including the supply power decrease section. That is, also when the temperature difference of the heating region of the honeycomb structure temporarily spreads, the supply power decrease section is provided so that it is possible to inhibit the spread of the temperature difference during the heating step, as compared with the case where the honeycomb structure is heated by the conventional method. Therefore, it is possible to decrease the maximum temperature difference between the highest temperature and the lowest temperature during the heating step including the supply power decrease section. The maximum temperature difference in the heating step is decreased in this manner, so that heat stress due to the temperature difference is not easily generated in the honeycomb structure, and it is possible to inhibit damages such as cracks from being generated in the honeycomb structure body.

The stop of the supply of the power and the decrease of the power in the supply power decrease section are preferably quickly (e.g., momentarily) performed.

In the heating method of honeycomb structure of the present embodiment, the supply power decrease section is preferably provided in a state where the highest temperature in the heating region of the honeycomb structure body becomes a temperature which is not less than the target temperature. According to such a constitution, the heat conduction is suitably performed from the portion of the honeycomb structure body in which the temperature is high to the portion of the honeycomb structure body in which the temperature is low. Hereinafter, the abovementioned "portion of the honeycomb structure body in which the temperature is high" may be referred to as "high temperature portion". Furthermore, the abovementioned "portion of the honeycomb structure body in which the temperature is low" may be referred to as "low temperature portion".

There is not any special restriction on a continuation time of the supply power decrease section. As described above, the supply power decrease section is provided for the purpose of raising the temperature of the low temperature portion of the honeycomb structure body by the heat conduction from the high temperature portion of the honeycomb structure body. Therefore, in the supply power decrease section, it is preferable that the lowest temperature in the heating region of the honeycomb structure body does not lower. In the supply power decrease section, when the lowest temperature in the heating region of the honeycomb structure body does not reach the target temperature, the after-mentioned supply power return section is preferably provided before the lowest temperature lowers. When the continuation time of the supply power decrease section is short, the heat conduction from the high temperature portion to the low temperature portion cannot sufficiently be performed sometimes. When the continuation time of the supply power decrease section is excessively long, an excessively long time is required sometimes until the whole honeycomb structure body becomes the target temperature or more.

In the heating method of honeycomb structure of the present embodiment, a time required until the lowest temperature in the heating region of the honeycomb structure body reaches the target temperature is preferably shorter. The "time required until the lowest temperature in the heating region of the honeycomb structure body reaches the target temperature" means the total elapsed time from the start of the heating step. Therefore, the abovementioned continuation time of the "supply power decrease section" is also included in the "time required until the lowest temperature in the heating region of the honeycomb structure body reaches the target temperature".

Furthermore, in the heating method of honeycomb structure of the present embodiment, it is preferable that the temperature which is not less than the target temperature is set as a heating end temperature and that the supply of the power is stopped at a point of time when the lowest temperature in the heating portion of the honeycomb structure body exceeds the above heating end temperature. That is, it is preferable to end the heating step at the point of time when the lowest temperature in the heating portion of the honeycomb structure body exceeds the above heating end temperature. The heating end temperature is more preferably the target temperature.

In the heating method of honeycomb structure of the present embodiment, in the heating step, there may be provided, after the abovementioned supply power decrease section, a supply power return section where the supply of the power to the honeycomb structure body is restarted or the power to be supplied to the honeycomb structure body is increased from a decreased state. That is, in the heating method of honeycomb structure of the present embodiment, the heating of the honeycomb structure body may be restarted again after the temperature difference in the heating portion of the honeycomb structure body is once decreased by the abovementioned supply power decrease section. Furthermore, when the power is decreased in the supply power decrease section, the power to be supplied to the honeycomb structure body may be increased from the decreased state. Furthermore, when the above heating end temperature is exceeded in the first supply power decrease section, the above supply power return section does not have to be provided.

There is not any special restriction on a value of the power after the supply power return section. For example, the value may be the same as the value of the power in the initial power supply period or may be smaller than the value of the power in the initial power supply period. In FIG. 2, the power after the supply power return section is 5 kW. In the supply power return section, the lowest temperature and the highest temperature in the heating region of the honeycomb structure body rise again. In FIG. 2 and FIG. 3, the lowest temperature in the heating region of the honeycomb structure body reaches the target temperature at a point of time when the elapsed time from the start of the heating step is 20 seconds, and hence the heating step is ended. That is, at the point of time when the abovementioned elapsed time becomes 20 seconds, the supply of the power to the honeycomb structure body is stopped.

Figure 5:
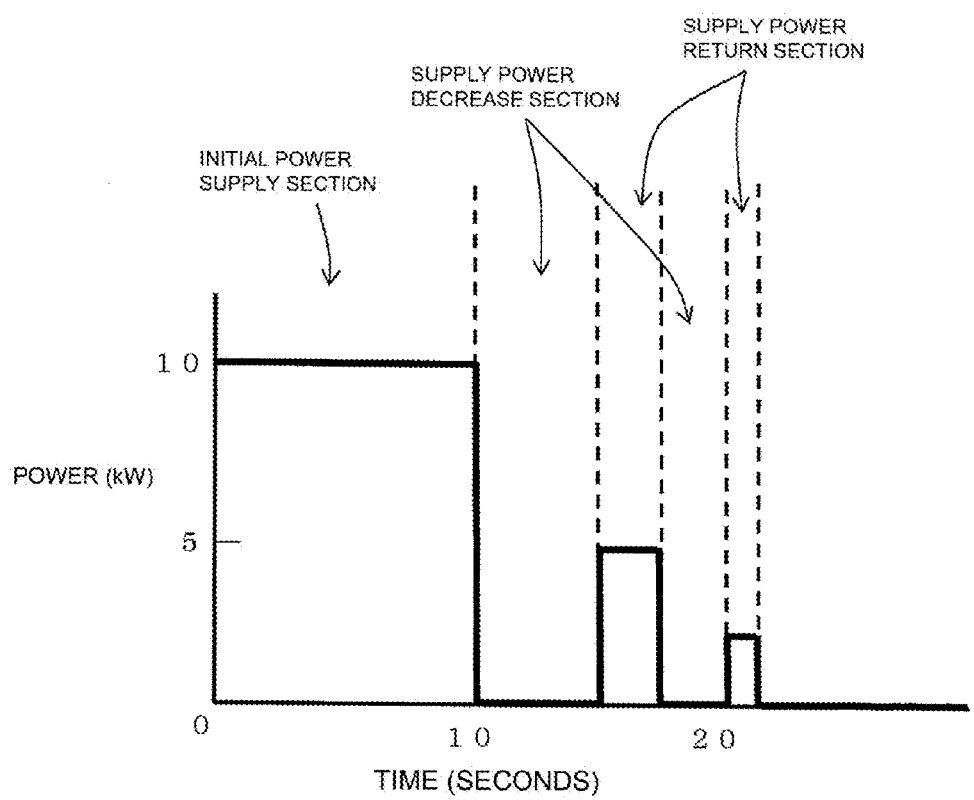
FIG. 5 is a graph showing still another example of relation between power (kW) to be supplied to the honeycomb structure body and elapsed time (seconds) of the heating step, in the heating step of the one embodiment of the heating method of honeycomb structure of the present invention.

In the heating method of honeycomb structure of the present embodiment, a second supply power decrease section may be provided after the supply power return section. Furthermore, a second supply power return section may be provided after the second supply power decrease section. Consequently, in the heating method of honeycomb structure of the present embodiment, the supply power decrease section and the supply power return section may alternately and repeatedly be provided a plurality of times. It is to be noted that the values of the powers of the second and subsequent supply power decrease sections and the second and subsequent supply power return sections may be the same as or different from the values of the powers of the first supply power decrease section and the first supply power return section. For example, as shown in FIG. 5, the second supply power decrease section may be provided after the first supply power return section, and afterward, the second supply power return section may further be provided. FIG. 5 is a graph showing still another example of the relation between power (kW) to be supplied to the honeycomb structure body and elapsed time (seconds) of the heating step, in the heating step of the one embodiment of the heating method of honeycomb structure of the present invention. In FIG. 5, the power in the second supply power return section is 2 kW.

Figure 6:
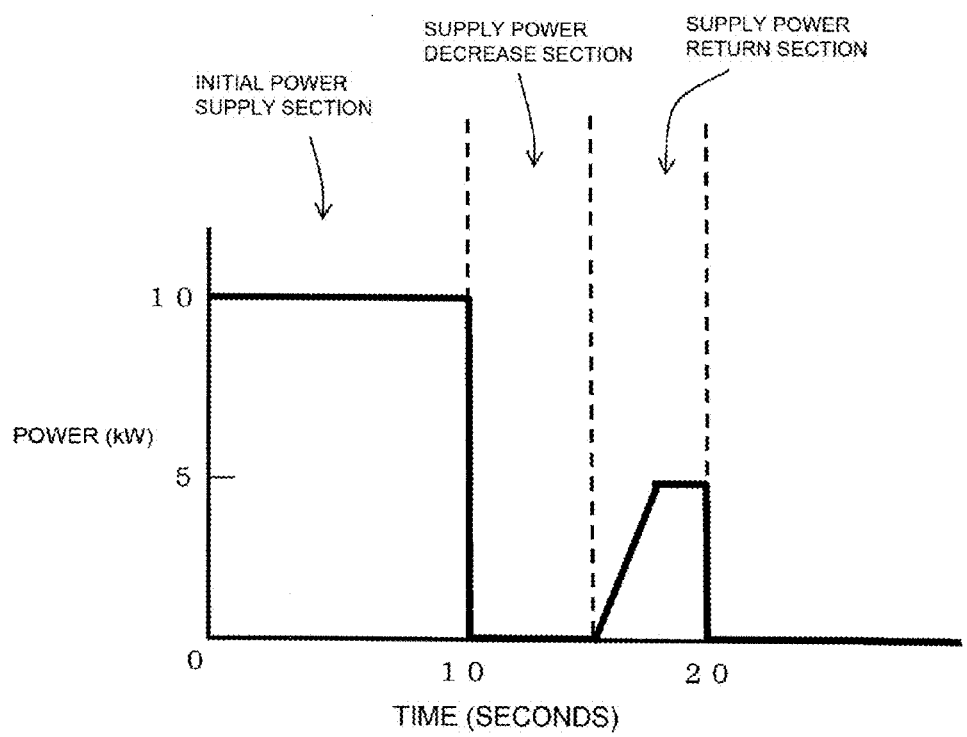
FIG. 6 is a graph showing a further example of relation between power (kW) to be supplied to the honeycomb structure body and elapsed time (seconds) of the heating step, in the heating step of the one embodiment of the heating method of honeycomb structure of the present invention.

In FIG. 2, the power is momentarily increased up to 5 kW in the supply power return section, but the power may gradually be increased in the supply power return section as shown in, for example, FIG. 6. Here, FIG. 6 is a graph showing a further example of the relation between power (kW) to be supplied to the honeycomb structure body and elapsed time (seconds) of the heating step, in the heating step of the one embodiment of the heating method of honeycomb structure of the present invention. FIG. 6 shows the example where the same power as in the heating step shown in FIG. 2 is supplied to the honeycomb structure body, except that the power is gradually increased in the supply power return section.

In the heating method of honeycomb structure of the present embodiment, there is not any special restriction on a type of catalyst loaded onto the partition walls of the honeycomb structure body. An example of the catalyst is a heretofore known catalyst for use in purification of a harmful component in an exhaust gas. Examples of the catalyst include an oxidation catalyst, a NOx absorber catalyst, and a ternary catalyst. Furthermore, an auxiliary catalyst represented by an oxide of cerium (Ce) or zirconium (Zr), an HC (hydrocarbon) adsorption material or the like may be loaded onto the partition walls.

A suitable example of a catalyst activating component is a noble metal such as platinum (Pt), palladium (Pd) or rhodium (Rh). Furthermore, the catalyst may include cerium, and at least one selected from the group consisting of a rare earth metal except cerium, an alkaline earth metal and a transition metal.

Here, examples of the rare earth metal include samarium (Sm), gadolinium (Gd), neodymium (Nd), yttrium (Y), scandium (Sc), cerium (Ce), lanthanum (La), and praseodymium (Pr).

Furthermore, examples of the alkaline earth metal to be included in the catalyst include magnesium (Mg), calcium (Ca), strontium (Sr), and barium (Ba).

Furthermore, examples of the transition metal to be included in the catalyst include manganese (Mn), iron (Fe), cobalt (Co), nickel (Ni), copper (Cu), zinc (Zn), titanium (Ti), zirconium (Zr), vanadium (V), and chromium (Cr).

The power in the initial power supply period of the heating step can suitably be determined in consideration of a size or a material of the honeycomb structure body. For example, when the honeycomb structure is for use in purification of the exhaust gas of a usual car, the power per gram of the honeycomb structure body in the initial power supply period is preferably from 3.3 to 33.3 W/g. When the power per gram of the honeycomb structure body in the initial power supply period is smaller than 3.3 W/g, it is difficult sometimes to rapidly heat the honeycomb structure body. On the other hand, when the power per gram of the honeycomb structure body in the initial power supply period is in excess of 33.3 W/g, heating unevenness in a carrier increases. Therefore, the cracks are disadvantageously generated due to the heat stress generated due to the heating unevenness, or the power is disadvantageously unnecessarily invested to deteriorate efficiency sometimes. The power per gram of the honeycomb structure body in the initial power supply period is preferably from 3.3 W/g to 33.3 W/g as described above and further preferably from 10 to 23.1 W/g.

The power in the supply power decrease section of the heating step is preferably such a power as to lower the highest temperature in the heating portion of the honeycomb structure body in this supply power decrease section. Specifically, the power in the supply power decrease section is more preferably 50% or less of the power in the initial power supply period. It is to be noted that in the supply power decrease section, the supply of the power may be stopped. When the supply of the power is stopped, the power in the supply power decrease section is zero (0). The power in the supply power decrease section is preferably 50% or less and further preferably 30% or less of the power in the initial power supply period.

The power in the supply power return section of the heating step is preferably suitably determined in consideration of a difference between the "lowest temperature in the heating portion" when the supply power return section is started and the "heating end temperature", the elapsed time from the start of the heating step, and the like.

In the heating method of honeycomb structure of the present embodiment, in the heating step, the honeycomb structure body is preferably heated until the lowest temperature in the heating region of the honeycomb structure body becomes 100° C. or more. That is, in the heating method of honeycomb structure of the present embodiment, the heating end temperature is preferably set to 100° C. or more. According to such a constitution, for example, a capability of the catalyst loaded onto the partition walls can sufficiently be exerted.

Furthermore, in the heating method of honeycomb structure of the present embodiment, in the heating step, the honeycomb structure body is preferably heated so that the highest temperature in the heating region of the honeycomb structure body does not exceed 1000° C. That is, the supply power decrease section is preferably suitably provided before the highest temperature in the heating region of the honeycomb structure body exceeds 1000° C. in the initial power supply period and the supply power return section. According to such a constitution, damages such as the cracks can effectively be prevented from being generated in the honeycomb structure body.

Furthermore, in the heating method of honeycomb structure of the present embodiment, the difference between the highest temperature and the lowest temperature in the heating region of the honeycomb structure body during the heating step is preferably 900° C. or less. According to such a constitution, the honeycomb structure body can be inhibited from locally having an excessively high temperature. In consequence, waste of power to be consumed in the heating can further be reduced, and the honeycomb structure can suitably be heated with less power consumption. The difference between the highest temperature and the lowest temperature in the heating region of the honeycomb structure body is further preferably 600° C. or less. There is not any special restriction on a lower limit value of the difference between the highest temperature and the lowest temperature. Ideally, the difference between the highest temperature and the lowest temperature is zero (0).

There is not any special restriction on a method of supplying the power to the honeycomb structure body. The power is preferably supplied in such a method as to more uniformly heat the tubular honeycomb structure body which heats by the electricity conduction. As the power source which supplies the power to the honeycomb structure body, for example, an inverter power source (DC-AC) in which it is easy to control the power or a power converter such as a DC-DC converter or an AC-DC converter may be used.

Figure 7:
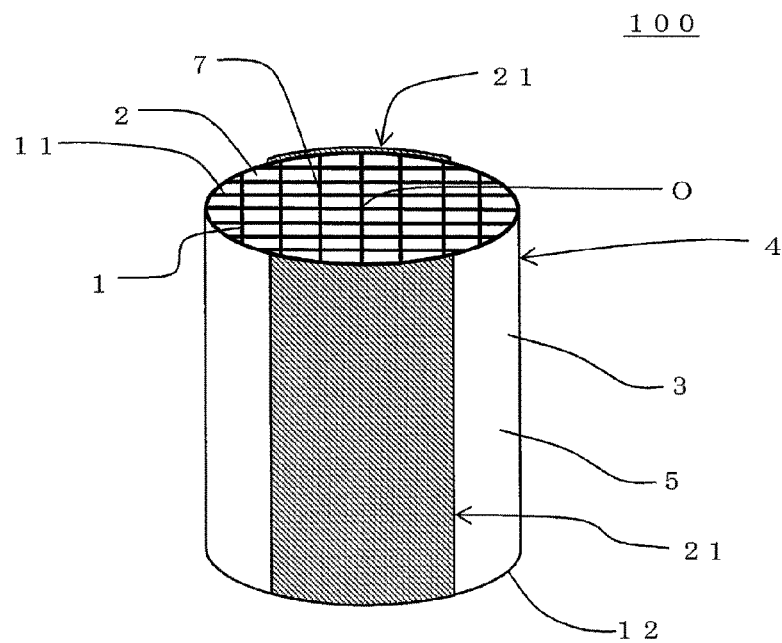
FIG. 7 is a perspective view schematically showing the honeycomb structure used in the heating method of honeycomb structure of the present invention.
Figure 8:
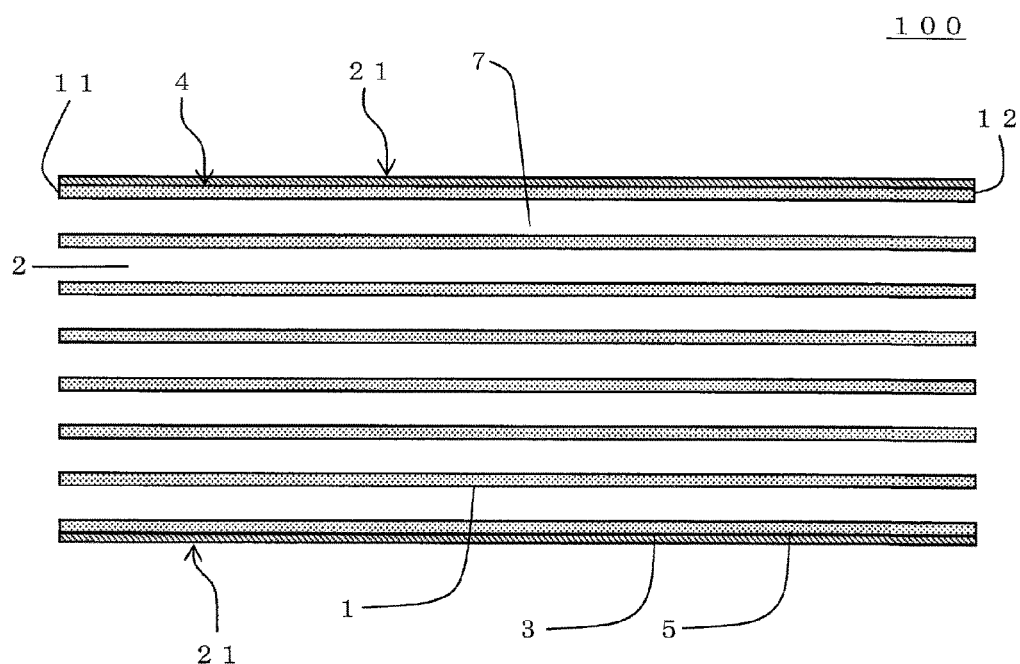
FIG. 8 is a schematic view showing a cross section of the honeycomb structure shown in FIG. 7 which is parallel to a cell extending direction.
Figure 9:
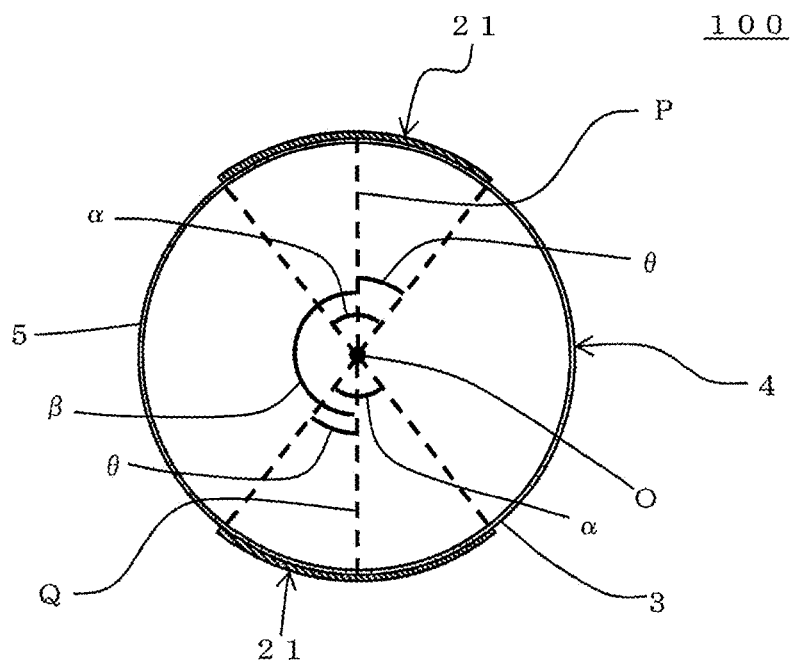
FIG. 9 is a schematic view showing a cross section of the honeycomb structure shown in FIG. 7 which is perpendicular to the cell extending direction.

(1-1) Honeycomb Structure:

Next, the honeycomb structure for use in the heating method of honeycomb structure of the present embodiment will be described. An example of the honeycomb structure for use in the heating method of honeycomb structure of the present embodiment is a honeycomb structure shown in FIG. 7 to FIG. 9. FIG. 7 is a perspective view schematically showing the honeycomb structure for use in the heating method of honeycomb structure of the present invention. FIG. 8 is a schematic view showing a cross section of the honeycomb structure shown in FIG. 7 which is parallel to a cell extending direction. FIG. 9 is a schematic view showing a cross section of the honeycomb structure shown in FIG. 7 which is perpendicular to the cell extending direction.

A honeycomb structure 100 shown in FIG. 7 to FIG. 9 includes a tubular honeycomb structure body 4 having porous partition walls 1 and a circumferential wall 3 positioned at an outermost circumference, and which is heated by electricity conduction, and a catalyst 7 loaded onto the partition walls of the honeycomb structure body 4. The partition walls 1 define and form a plurality of cells 2 which become through channels for a fluid and extend from a first end face 11 to a second end face 12. The honeycomb structure 100 further includes two electrode members 21, 21 disposed on a side surface 5 of the honeycomb structure body 4.

In the honeycomb structure 100, an electrical resistivity of the honeycomb structure body 4 is preferably from 1 to 200 Ωcm and further preferably from 40 to 100 Ωcm. In a case where the electrical resistivity of the honeycomb structure body 4 is from 1 to 200 Ωcm, even when a current is allowed to flow by using a power source having a high voltage, the current does not excessively flow, so that the honeycomb structure is suitably usable as a heater. The electrical resistivity of the partition walls is a value measured by a four-terminal method. The electrical resistivity of the honeycomb structure body 4 is a value at 400° C.

Furthermore, a porosity of the partition walls is preferably from 30 to 60% and further preferably from 30 to 50%. When the porosity of the partition walls is smaller than 30%, the partition walls are disadvantageously deformed sometimes during preparation of the honeycomb structure body. When the porosity is in excess of 60%, strength of the honeycomb structure deteriorates sometimes. The porosity is a value measured by a mercury porosimeter.

Furthermore, an average pore diameter of the partition walls is preferably from 2 to 15 μm and further preferably from 4 to 8 μm. When the average pore diameter of the partition walls is smaller than 2 μm, the electrical resistivity excessively becomes larger sometimes. When the average pore diameter is larger than 15 μm, the electrical resistivity excessively becomes smaller sometimes. The average pore diameter is a value measured by the mercury porosimeter.

Furthermore, a thickness of the partition walls is preferably from 50 to 260 μm and further preferably from 70 to 180 μm. When the thickness of the partition walls is smaller than 50 μm, the strength of the honeycomb structure deteriorates sometimes. When the thickness of the partition walls is larger than 260 μm, a pressure loss during passing of an exhaust gas through the honeycomb structure enlarges sometimes.

A cell density of the honeycomb structure is preferably from 40 to 150 cells/cm$^2$ and further preferably from 70 to 100 cells/cm$^2$. When the cell density is in such a range, a purification performance of a catalyst can be heightened in a state where the pressure loss during the passing of the exhaust gas is reduced. When the cell density is lower than 40 cells/cm$^2$, a catalyst loading area is reduced sometimes. When the cell density is higher than 150 cells/cm$^2$, the pressure loss during the passing of the exhaust gas through the honeycomb structure enlarges sometimes.

In the honeycomb structure 100, a material of the partition walls 1 and the circumferential wall 3 preferably includes a silicon-silicon carbide composite material or a silicon carbide material as a main component, and is further preferably the silicon-silicon carbide composite material or the silicon carbide material. When "the material of the partition walls 1 and the circumferential wall 3 includes the silicon-silicon carbide composite material or the silicon carbide material as the main component", it is meant that the partition walls 1 and the circumferential wall 3 contain 90 mass % or more of the silicon-silicon carbide composite material or the silicon carbide material in the whole material. When such a material is used, the electrical resistivity of the honeycomb structure body can be from 1 to 200 Ωcm. Here, the silicon-silicon carbide composite material contains silicon carbide particles as aggregates, and silicon as a bonding material which bonds the silicon carbide particles, and the plurality of silicon carbide particles are preferably bonded by silicon so that pores are formed among the silicon carbide particles. Furthermore, in the silicon carbide material, the silicon carbide particles are mutually sintered.

In the honeycomb structure of the present embodiment, when the material of the partition walls of the honeycomb structure body is the silicon-silicon carbide composite material, a "mass of the silicon carbide particles" and a "mass of silicon" are preferably in the following relation. That is, a ratio of the "mass of silicon" to a total of the "mass of the silicon carbide particles" and the "mass of silicon" is preferably from 10 to 40 mass % and further preferably from 15 to 35 mass %. Hereinafter, the ratio of the mass of silicon to the total of the mass of the silicon carbide particles and the mass of silicon may be referred to as "mass ratio of silicon". When the mass ratio of silicon is lower than 10 mass %, the strength of the honeycomb structure deteriorates sometimes. When the mass ratio of silicon is higher than 40 mass %, a shape cannot be held sometimes during firing. The above "mass of the silicon carbide particles" is the "mass of the silicon carbide particles as the aggregates" to be contained in the partition walls. The above "mass of silicon" is the "mass of silicon as the bonding material" to be contained in the partition walls.

A shape of the cells in the cross section perpendicular to the cell extending direction of the honeycomb structure is preferably a quadrangular shape, a hexagonal shape, an octagonal shape, or any combination of these shapes. When the cell shape is such a shape, the pressure loss during the passing of the exhaust gas through the honeycomb structure is reduced, and the purification performance of the catalyst becomes excellent.

There is not any special restriction on a thickness of the circumferential wall constituting the outermost circumference of the honeycomb structure body. For example, the thickness of the circumferential wall is preferably from 0.1 to 1 mm, further preferably from 0.2 to 0.8 mm, and especially preferably from 0.2 to 0.5 mm. When the thickness of the circumferential wall is smaller than 0.1 mm, the strength of the honeycomb structure deteriorates sometimes. When the thickness of the circumferential wall is larger than 1 mm, an area of each partition wall onto which the catalyst is loaded is reduced sometimes.

A porosity of the circumferential wall of the honeycomb structure body is preferably from 35 to 60%, further preferably from 35 to 55%, and especially preferably from 35 to 50%. When the porosity of the circumferential wall of the honeycomb structure body is in such a range, a thermal shock resistance of the honeycomb structure can be improved. When the porosity of the circumferential wall of the honeycomb structure body is smaller than 35%, the effect of improving the thermal shock resistance of the honeycomb structure deteriorates sometimes. When the porosity of the circumferential wall of the honeycomb structure body is larger than 60%, a mechanical strength of the honeycomb structure deteriorates sometimes.

There is not any special restriction on a shape of the honeycomb structure body. Examples of the shape of the honeycomb structure body include a tubular shape in which a bottom surface has a circular shape (a cylindrical shape), a tubular shape in which the bottom surface has an oval shape, and a tubular shape in which the bottom surface has a polygonal shape. Examples of the above polygonal shape include a quadrangular shape, a pentangular shape, a hexagonal shape, a heptagonal shape, and an octagonal shape. Furthermore, for a size of the honeycomb structure body, an area of the bottom surface is preferably from 2000 to 20000 mm$^2$ and further preferably from 4000 to 10000 mm$^2$. Furthermore, a length of a central axis direction of the honeycomb structure is preferably from 50 to 200 mm and further preferably from 75 to 150 mm.

As shown in FIG. 7 to FIG. 9, the honeycomb structure 100 may further include the two electrode members 21, 21 disposed on the side surface 5 of the honeycomb structure body 4. In the honeycomb structure 100, each of the two electrode members 21, 21 is preferably formed into a band shape extending in the extending direction of the cells 2 of the honeycomb structure body 4. Furthermore, in the cross section perpendicular to the extending direction of the cells 2, one electrode member 21 in the two electrode members 21, 21 is preferably disposed on a side opposite to the other electrode member 21 in the two electrode members 21, 21 via a center O of the honeycomb structure body 4. According to such a constitution as described above, the power can more evenly be supplied to the honeycomb structure body 4. Therefore, a deviation of the honeycomb structure body 4 can be inhibited to a certain degree. However, even in the honeycomb structure 100 having this constitution, the deviation occurs in a temperature distribution due to a length of a distance between the two electrode members 21, 21, when the power is actually supplied to the honeycomb structure body 4. When the heating method of honeycomb structure of the present embodiment is used, the deviation of the temperature distribution of a heating portion can further be inhibited. It is to be noted that the number of the electrode members to be disposed on the honeycomb structure body or a shape of each electrode member is not limited to such a configuration as shown in FIG. 7 to FIG. 9.

Here, a constitution where "in the cross section perpendicular to the extending direction of the cells 2, the one electrode member 21 is disposed on the side opposite to the other electrode member 21 via the center O of the honeycomb structure body 4" will hereinafter be described in detail. First, as shown in FIG. 9, a line segment connecting a center point of the one electrode member 21 to the center O of the honeycomb structure body 4 in the cross section perpendicular to the cell extending direction is to be "line segment P". Furthermore, a line segment connecting a center point of the other electrode member 21 to the center O of the honeycomb structure body 4 in the cross section perpendicular to the extending direction of the cells 2 is to be "line segment Q". The center points of the one electrode member 21 and the other electrode member 21 are points of centers in a circumferential direction of the honeycomb structure body 4. Furthermore, the "opposite side via the center O of the honeycomb structure body 4" means such a positional relation that an angle β formed by the line segment P and the line segment Q is in a range of 170° to 190°. Therefore, in the abovementioned constitution, the two electrode members 21, 21 are disposed in such a positional relation as to satisfy the above range of the angle β. In FIG. 9, the angle β formed by the line segment P and the line segment Q is 180°.

Furthermore, for the honeycomb structure 100, in the cross section perpendicular to the extending direction of the cells 2, 0.5 time a central angle α of each of the electrode members 21, 21 (an angle θ of 0.5 time the central angle α) is preferably from 15 to 65° and further preferably from 30 to 60°. The honeycomb structure 100 having this constitu-tion is heated by the heating method of honeycomb structure of the present embodiment, so that the temperature unevenness during the heating can further be decreased.

Furthermore, the "angle θ of 0.5 time the central angle α" of the one electrode member 21 preferably has a size of 0.8 to 1.2 times and further preferably has a size of 1.0 time (the same size) to the "angle θ of 0.5 time the central angle α" of the other electrode member 21. The honeycomb structure 100 having such a constitution is heated by the heating method of honeycomb structure of the present embodiment, so that the temperature unevenness during the heating can further be decreased.

As shown in FIG. 7 to FIG. 9, the electrode member 21 of the honeycomb structure 100 has such a shape as obtained by bending a planar rectangular member along a circumference of a cylindrical shape. Here, a shape obtained when the bent electrode member 21 is deformed into a planar member which is not bent is referred to as "planar shape" of the electrode member 21. The "planar shape" of the electrode member 21 shown in FIG. 7 to FIG. 9 is a rectangular shape. Furthermore, the "circumferential shape of the electrode member" means "circumferential shape in the planar shape of the electrode member".

In the honeycomb structure 100, the circumferential shape of the band-like electrode member 21 may be a shape in which a corner portion of the rectangular shape is formed in a curved manner. Furthermore, the circumferential shape of the band-like electrode member 21 may be a shape in which the corner portion of the rectangular shape is linearly chamfered. The abovementioned curved manner and chamfered manner in the circumferential shape of the band-like electrode member 21 may be used compositely in the one electrode member.

In the honeycomb structure 100, the electrical resistivity of the electrode member 21 is preferably from 0.1 to 100 Ωcm and further preferably from 0.1 to 50 Ωcm. When the electrical resistivity of the electrode member 21 is in such a range, each of the two electrode members 21, 21 effectively performs a function of an electrode in a piping line through which a high-temperature exhaust gas passes. When the electrical resistivity of the electrode member 21 is smaller than 0.1 Ωcm, a temperature of the honeycomb structure body in the vicinity of each of both ends of the electrode member 21 easily rises sometimes in the cross section perpendicular to the cell extending direction. When the electrical resistivity of the electrode member 21 is larger than 100 Ωcm, the current does not easily flow, and hence the electrode member does not easily perform the function of the electrode. The electrical resistivity of the electrode member is a value at 400° C.

The electrode member 21 preferably includes a silicon-silicon carbide composite material or a silicon carbide material as a main component, and is further preferably the silicon-silicon carbide composite material or the silicon carbide material. The electrode member 21 is especially preferably formed by using silicon carbide particles and silicon as raw materials, except usually contained impurities. In this way, the electrode member 21 includes the "silicon-silicon carbide composite material or the silicon carbide material" as the main component, and a component of the electrode member 21 and a component of the honeycomb structure body 4 thereby become the same component or close components. In consequence, thermal expansion coefficients of the electrode member 21 and the honeycomb structure body 4 have the same value or close values. Furthermore, the material of the electrode member 21 and the material of the honeycomb structure body 4 become the same material or close materials, and hence a bonding strength between the electrode member 21 and the honeycomb structure body 4 also heightens. Therefore, even when the heat stress is applied to the honeycomb structure, the electrode member 21 can be prevented from being peeled from the honeycomb structure body 4, and a bonding portion between the electrode member 21 and the honeycomb structure body 4 can be prevented from being damaged.

An average pore diameter of the electrode member 21 is preferably from 5 to 45 µm and further preferably from 7 to 40 µm. When the average pore diameter of the electrode member 21 is in such a range, a suitable electrical resistivity can be obtained. When the average pore diameter of the electrode member 21 is smaller than 5 µm, the electrical resistivity excessively heightens sometimes. When the average pore diameter of the electrode member 21 is larger than 45 µm, the strength of the electrode member 21 weakens, and the electrode member is easily damaged sometimes. The average pore diameter is a value measured by the mercury porosimeter.

In the honeycomb structure 100, the electrical resistivity of the electrode member 21 is preferably lower than the electrical resistivity of the honeycomb structure body 4. Furthermore, the electrical resistivity of the electrode member 21 is further preferably 20% or less and especially preferably from 1 to 10% of the electrical resistivity of the honeycomb structure body 4. The electrical resistivity of the electrode member 21 is 20% or less of the electrical resistivity of the honeycomb structure body 4, and the electrode member 21 thereby more effectively functions as the electrode.

Furthermore, although not shown in the drawing, a connecting portion to connect a wiring line from a power source may further be disposed in each electrode member. According to this constitution, a power is more easily supplied to the honeycomb structure body.

An isostatic strength of the honeycomb structure 100 is preferably 1 MPa or more and further preferably 3 MPa or more. The larger the value of the isostatic strength is, the more suitable the strength becomes. However, when a material, a structure or the like of the honeycomb structure 100 is taken into consideration, an upper limit of the strength is about 6 MPa. When the isostatic strength is smaller than 1 MPa, the honeycomb structure is easily damaged sometimes. The isostatic strength is a value measured under a hydrostatic pressure in water.

There is not any special restriction on a type of catalyst loaded onto the partition walls of the honeycomb structure body. An example of the catalyst is a heretofore known catalyst for use in purification of a harmful component in an exhaust gas. Examples of the catalyst include an oxidation catalyst, an NOx absorber catalyst, and a ternary catalyst. Furthermore, an auxiliary catalyst represented by an oxide of cerium (Ce) or zirconium (Zr), an HC (hydrocarbon) adsorption material or the like may be loaded onto the partition walls.

There is not any special restriction on an amount of the catalyst to be loaded onto the partition walls. Hereinafter, a mass (g) of the catalyst to be loaded per L (liter) of a volume of the honeycomb structure body may be referred to as "loading amount (g/L)". For example, the loading amount of the catalyst can suitably be set in accordance with the type of catalyst or an amount of the harmful component of the exhaust gas which becomes a purification object.

EXAMPLES

Hereinafter, the present invention will specifically be described in accordance with examples, but the present invention is not limited to these examples.

Example 1

First, there was prepared a honeycomb structure including a tubular honeycomb structure body which has porous partition walls to define and form a plurality of cells and a circumferential wall positioned at an outermost circumference, and which is heated by electricity conduction; and a catalyst loaded onto the partition walls of the honeycomb structure body. In Example 1, a power was supplied to the honeycomb structure body of this honeycomb structure, to heat the honeycomb structure.

The honeycomb structure had such a constitution as in the following. In the honeycomb structure, a thickness of the partition walls was about 100 µm and a cell density was 600 cells/cm$^2$. Furthermore, a bottom surface of the honeycomb structure had a circular shape with a diameter of 93 mm, and a length of the honeycomb structure in a cell extending direction was 100 mm.

Furthermore, a porosity of the honeycomb structure was 48%. The porosity is a value measured by a mercury porosimeter (AutoPore IV9505 manufactured by Micromeritics Co.).

A material of the partition walls and the circumferential wall included a silicon-silicon carbide composite material as a main component. An electrical resistivity of the honeycomb structure body was 30 Ωcm.

Furthermore, in this honeycomb structure, two electrode members were disposed on a side surface of the honeycomb structure body. The electrode members were prepared by using a raw material including silicon carbide particles and silicon as main components.

Specifically, the above electrode member forming raw material was applied in the form of a band onto the side surface of the honeycomb structure body so that a thickness (the thickness after drying and firing) was 1.0 mm. The electrode member forming raw material was applied to two portions of the side surface of the honeycomb structure body. Then, in a cross section perpendicular to the cell extending direction, one of the two portions to which the electrode member forming raw material was applied was disposed on a side opposite to the other portion via a center of the honeycomb structure body. A shape (a circumferential shape) of the electrode member forming raw material applied to the side surface of the honeycomb structure body was rectangular. The electrode member forming raw material was applied to the side surface of the honeycomb structure body so that a coating film by the electrode member forming raw material extended between both end portions of the honeycomb structure body. The electrode member forming raw material applied to the honeycomb structure body was dried and fired to prepare the electrode members. An electrical resistivity of each electrode member was 1 Ωcm.

Furthermore, a ternary catalyst was loaded onto the partition walls of the honeycomb structure. A loading amount of the catalyst was 150 g/L. A catalyst activating temperature of this catalyst was 300° C. Therefore, in Example 1, the target temperature during the heating of the honeycomb structure body was set to 300° C.

Such two electrode members of the honeycomb structure were electrically connected to a DC power source by wiring lines, and the power was supplied to the honeycomb structure body, to heat the honeycomb structure by Joule heat.

Figure 10:
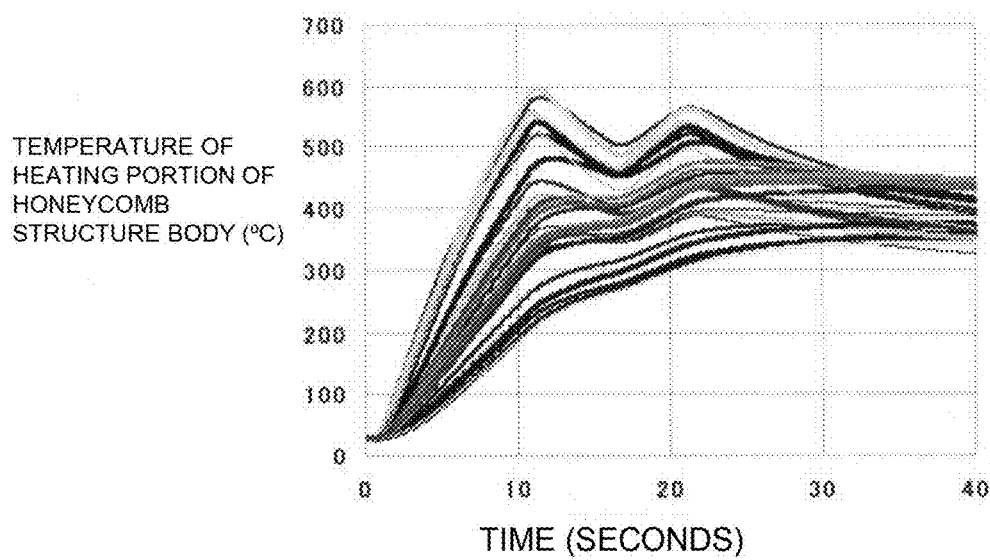
FIG. 10 is a graph showing the relation between temperature (° C.) of the honeycomb structure body and elapsed time (seconds) of the heating step, in the heating step of the heating method of honeycomb structure of Example 1.
Figure 11:
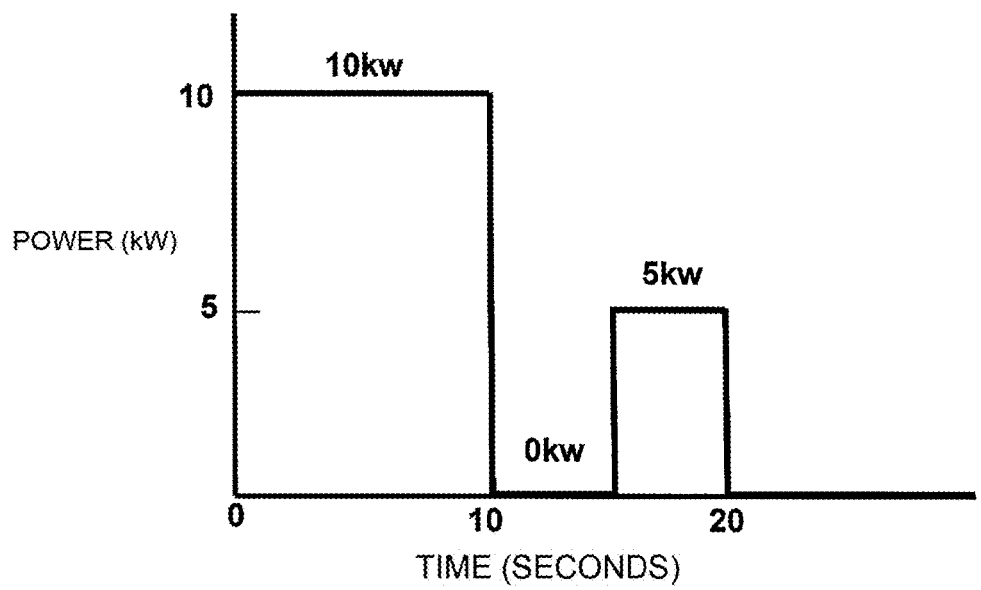
FIG. 11 is a graph showing the relation between power (kW) to be supplied to the honeycomb structure body and elapsed time (seconds) of the heating step, in the heating step of the heating method of honeycomb structure of Example 1.
Figure 16A:
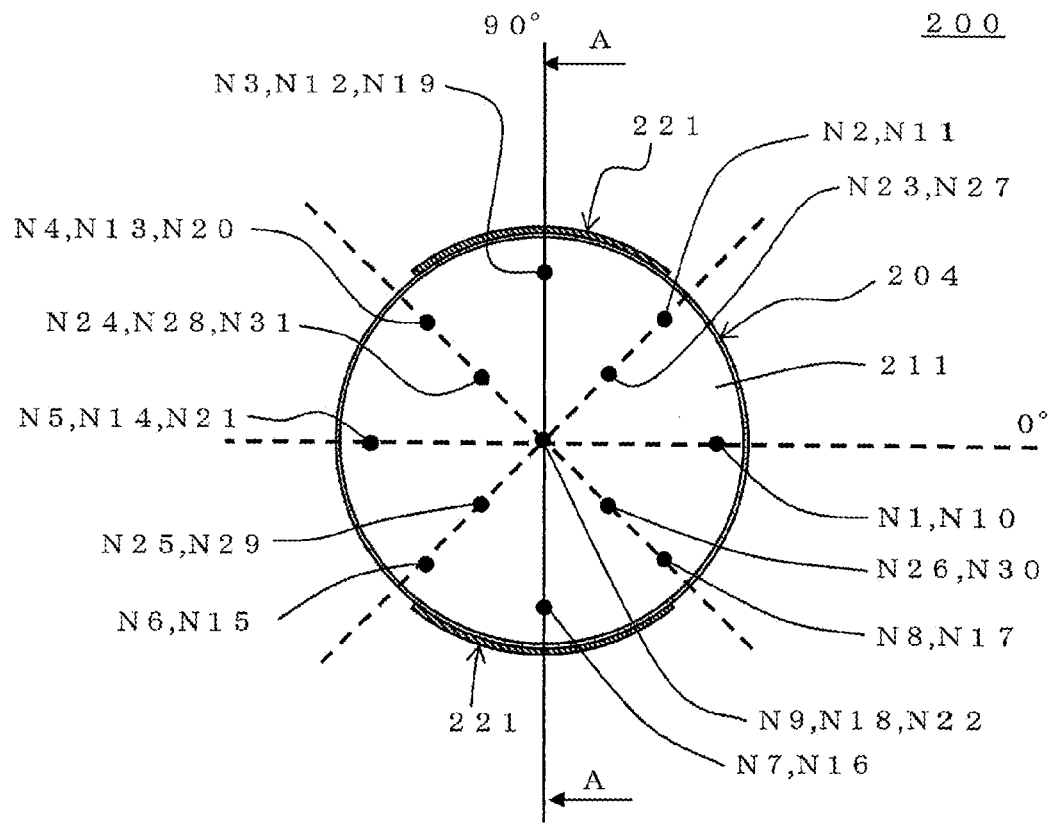
FIG. 16A is an explanatory view to explain measurement points of the honeycomb structure body in the Examples, and is a plan view of the first end face side of the honeycomb structure.

In a heating method of honeycomb structure of Example 1, when the honeycomb structure was heated, a temperature of the honeycomb structure body constituting the honeycomb structure was measured at 31 measurement points. FIG. 16A and FIG. 16B show the measurement points (N1 to N31) at which the temperature of a honeycomb structure body 204 of a honeycomb structure 200 was measured. Here, FIG. 16A is an explanatory view to explain the measurement points of the honeycomb structure body in the Examples, and is a plan view of a first end face side of the honeycomb structure. FIG. 16B is a sectional view showing a cross section cut along the A-A line of FIG. 16A. Hereinafter, the measurement points N1 to N31 to measure the temperature of the honeycomb structure body 204 of the honeycomb structure 200 will be described with reference to FIG. 16A and FIG. 16B. First, a measurement point on a broken line indicating 0° on a first end face 211 side of the honeycomb structure body 204 was the measurement point N1, a measurement point at a position moved counterclockwise as much as 45° was the measurement point N2, and a measurement point at a position further moved counterclockwise as much as 45° was the measurement point N3. In this way, the measurement points were disposed in a counterclockwise manner every 45°. Furthermore, in a direction from the first end face 211 toward a second end face 212 of the honeycomb structure body 204, the measurement points were disposed in both end portions and an intermediate portion, respectively. It is to be noted that in FIG. 16A and FIG. 16B, reference numeral 221 denotes an electrode member. In the heating method of honeycomb structure of Example 1, the power was supplied while confirming the lowest temperature and the highest temperature in a heating portion of the measured honeycomb structure body. FIG. 10 is a graph showing the relation between temperature (° C.) of the honeycomb structure body and elapsed time (seconds) of the heating step, in the heating step of the heating method of honeycomb structure of Example 1. FIG. 11 is a graph showing the relation between power (kW) to be supplied to the honeycomb structure body and elapsed time (seconds) of the heating step, in the heating step of the heating method of honeycomb structure of Example 1.

As shown in FIG. 10 and FIG. 11, in the heating method of honeycomb structure of Example 1, the power to be supplied to the honeycomb structure body for ten seconds from the start of the supply of the power was 10 kW. A period of ten seconds from the start of the supply of the power is an "initial power supply period". A time to start the supply of the power is the start time of the heating step. The lowest temperature in the heating portion of the honeycomb structure body at a point of time when ten seconds elapsed from the start time of the heating step was about 180° C. Furthermore, the highest temperature in the heating portion of the honeycomb structure body at the point of time when ten seconds elapsed from the start time of the heating step was about 580° C.

A "supply power decrease section" was provided for five seconds after this "initial power supply period". Specifically, the supply of the power to the honeycomb structure body was stopped between ten seconds and 15 seconds counted from the start time of the heating step. In the "supply power decrease section", the highest temperature in the heating portion of the honeycomb structure body lowered. Furthermore, in the "supply power decrease section", the lowest temperature in the heating portion of the honeycomb structure body rose. The rise of the lowest temperature in the heating portion of the honeycomb structure body took place because the "supply power decrease section" was provided to allow the temperature to become uniform by heat conduction from a high temperature portion. The lowest temperature in the heating portion of the honeycomb structure body at a point of time when 15 seconds elapsed from the start time of the heating step was about 260° C. Furthermore, the highest temperature in the heating portion of the honeycomb structure body at the point of time when 15 seconds elapsed from the start time of the heating step was about 525° C.

A "supply power return section" was provided for five seconds after the "supply power decrease section". Specifically, the supply of the power to the honeycomb structure body was restarted between 15 seconds and 20 seconds counted from the start time of the heating step. In the "supply power return section", a power of 5 kW was supplied to the honeycomb structure body. The lowest temperature in the heating portion of the honeycomb structure body exceeded 300° C. at a point of time when 20 seconds elapsed from the start time of the heating step, and hence the supply of the power to the honeycomb structure body was stopped. This "point of time when the supply of the power to the honeycomb structure body is stopped" is an "end time of the heating step". Furthermore, a "section from the start of the heating step to the stop of the supply of the power to the honeycomb structure body" is a "heating step continuation section". This "heating step continuation section" also includes the above "supply power return section". The lowest temperature at the end time of the heating step in the heating portion of the honeycomb structure body was 302° C.

In the heating method of honeycomb structure of Example 1, the electric energy supplied to the honeycomb structure body in the heating step continuation section was 125 kWs. A maximum difference (hereinafter referred to as "maximum temperature difference") between the highest temperature and the lowest temperature in the heating portion of the honeycomb structure body in the heating step continuation section was 381° C. Furthermore, the highest temperature in the heating portion of the honeycomb structure body in the heating step continuation section was 596° C. Table 1 shows a total time (seconds) of the heating step, the electric energy (kWs) supplied to the honeycomb structure body, the highest temperature (° C.), the maximum temperature difference (° C.), and the lowest temperature (° C.) at the end time of the heating step in the heating method of honeycomb structure of Example 1.

Furthermore, for the honeycomb structure in 20 seconds after the start time of the heating step, it was evaluated whether the lowest temperature in the heating portion of the honeycomb structure body was higher than the target temperature (i.e., 300° C.). A column of "target temperature" in Table 1 shows the evaluation result. For the evaluation concerning this catalyst activating temperature, a case where the lowest temperature in the heating portion of the honeycomb structure body in 20 seconds after the start time of the heating step (i.e., at the end time of the heating step) is the target temperature or more is evaluated as "pass". Furthermore, for the evaluation concerning this target temperature, a case where the lowest temperature in the heating portion of the honeycomb structure body in 20 seconds after the start time of the heating step (i.e., at the end time of the heating step) is less than the target temperature is evaluated as "failure".

Figure 15:
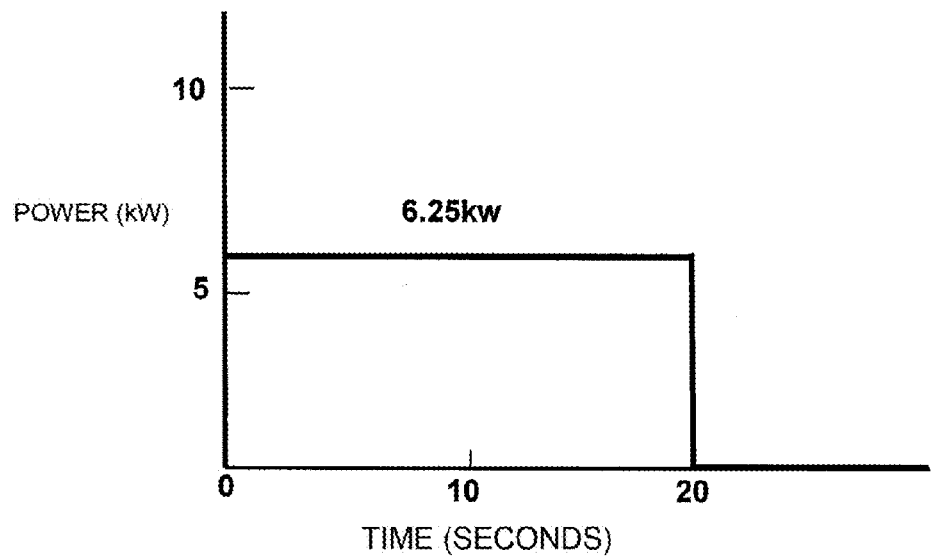
FIG. 15 is a graph showing the relation between power (kW) to be supplied to the honeycomb structure body and elapsed time (seconds) of the heating step, in the heating step of the heating method of honeycomb structure of Comparative Example 1.

Furthermore, after the heating step ended, presence/absence of generation of cracks was evaluated for the honeycomb structure. A column of "cracks" in Table 1 shows the evaluation result. For the presence/absence of the generation of the cracks, the evaluation was performed by a method of visual inspection by a microscope. A case where there are not any cracks is evaluated as "pass" and a case where there are the cracks is evaluated as "failure".

honeycomb structure of Comparative Example 1. FIG. 15 is a graph showing the relation between power (kW) to be supplied to the honeycomb structure body and elapsed time (seconds) of the heating step, in the heating step of the heating method of honeycomb structure of Comparative Example 1.

TABLE 1

| | | | | Heating step continuation section | | | | |
|---|---|---|---|---|---|---|---|---|
| | Heating method | Total time of heating step (seconds) | Electric energy (kWs) | Highest temp. (° C.) | Max. temp. difference (° C.) | Lowest temp. at heating step end time (° C.) | Target temp. | Cracks |
| Example 1 | With supply power decrease section | 20 | 125 | 596 | 381 | 302 | Pass | Pass |
| Example 2 | With supply power decrease section | 20 | 137 | 627 | 377 | 317 | Pass | Pass |
| Comparative Example 1 | Without supply power decrease section (constant power) | 20 | 125 | 629 | 348 | 281 | Failure | Pass |
| Comparative Example 2 | Without supply power decrease section (constant power) | 20 | 137 | 702 | 402 | 310 | Pass | Failure |

Example 2

Figure 12:
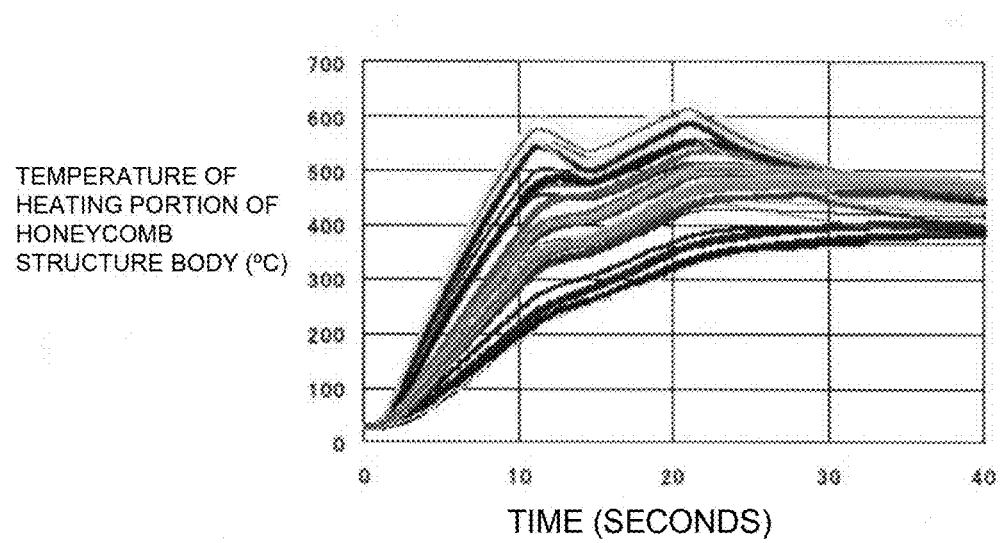
FIG. 12 is a graph showing the relation between temperature (° C.) of a honeycomb structure body and elapsed time (seconds) of the heating step, in the heating step of the heating method of honeycomb structure of Example 2.
Figure 13:
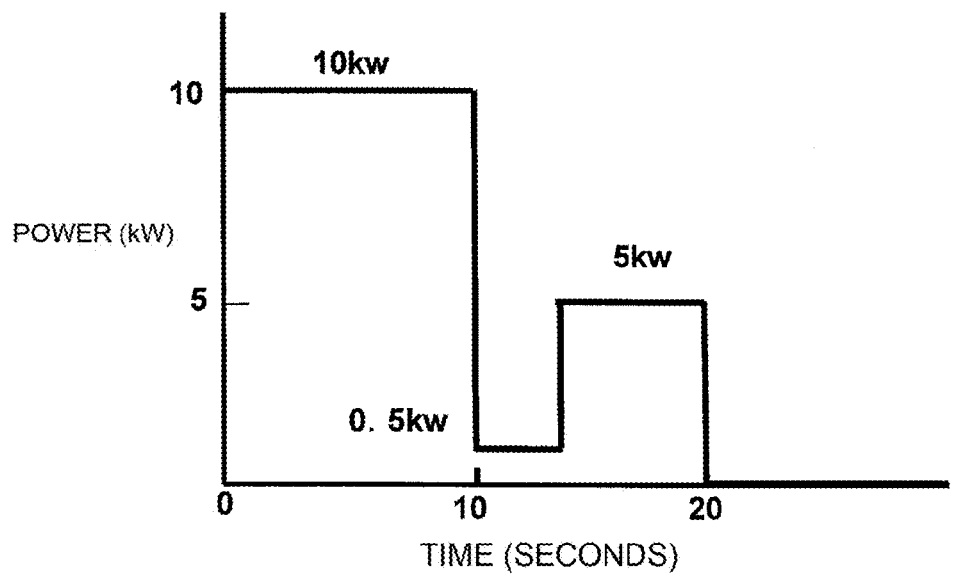
FIG. 13 is a graph showing the relation between power (kW) to be supplied to the honeycomb structure body and elapsed time (seconds) of the heating step, in the heating step of the heating method of honeycomb structure of Example 2.

In Example 2, as shown in FIG. 12 and FIG. 13, a power to be supplied to a honeycomb structure body for ten seconds from the start of the supply of the power was 10 kW. Afterward, the power for three seconds was 0.5 kW, and then the power was increased to 5 kW for seven seconds. FIG. 12 is a graph showing the relation between temperature (° C.) of the honeycomb structure body and elapsed time (seconds) of the heating step, in the heating step of the heating method of honeycomb structure of Example 2. FIG. 13 is a graph showing the relation between power (kW) to be supplied to the honeycomb structure body and elapsed time (seconds) of the heating step, in the heating step of the heating method of honeycomb structure of Example 2. In the heating method of honeycomb structure of Example 2, the electric energy supplied to the honeycomb structure body was 137 kWs. Table 1 shows a total time (seconds) of the heating step, the electric energy (kWs) supplied to the honeycomb structure body, the highest temperature (° C.), a maximum temperature difference (° C.), and the lowest temperature (° C.) at an end time of the heating step in the heating method of honeycomb structure of Example 2.

Furthermore, also in Example 2, for the honeycomb structure at the end time of the heating step, it was evaluated whether the lowest temperature in a heating portion of the honeycomb structure body was higher than a target temperature. Furthermore, presence/absence of generation of cracks was also evaluated by a method similar to that of Example 1. Table 1 shows the evaluation results.

Comparative Example 1

Figure 14:
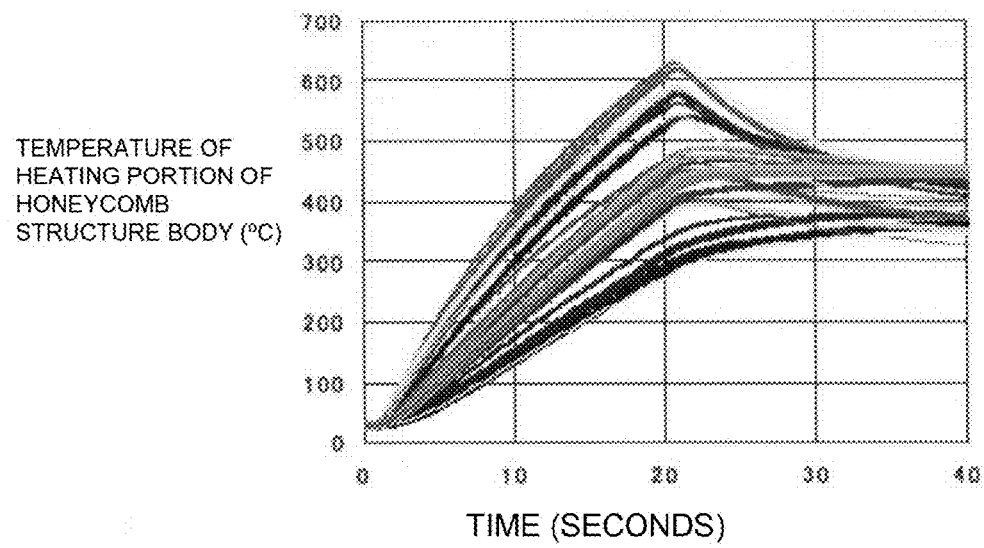
FIG. 14 is a graph showing the relation between temperature (° C.) of the honeycomb structure body and elapsed time (seconds) of the heating step, in the heating step of the heating method of honeycomb structure of Comparative Example 1.

In Comparative Example 1, as shown in FIG. 14 and FIG. 15, a power of 6.25 kW was supplied to a honeycomb structure body for 20 seconds, to heat the honeycomb structure body. The honeycomb structure used was similar to the honeycomb structure used in Example 1. FIG. 14 is a graph showing the relation between temperature (° C.) of the honeycomb structure body and elapsed time (seconds) of the heating step, in the heating step of the heating method of Comparative Example 2

In Comparative Example 2, a power of 6.85 kW was supplied to a honeycomb structure body for 20 seconds, to heat the honeycomb structure body. The honeycomb structure used was similar to the honeycomb structure used in Example 1.

Table 1 shows a total time (seconds) of the heating step, the electric energy (kWs) supplied to the honeycomb structure body, the highest temperature (° C.), the maximum temperature difference (° C.), and the lowest temperature (° C.) at the end time of the heating step in the heating method of honeycomb structure of each of Comparative Examples 1 and 2. Furthermore, also in Comparative Examples 1 and 2, for the honeycomb structure at the end time of the heating step, it was evaluated whether the lowest temperature in a heating portion of the honeycomb structure body was higher than a target temperature. Furthermore, for the honeycomb structure, presence/absence of generation of cracks was also evaluated by a method similar to that of Example 1. Table 1 shows the evaluation results.

CONCLUSION

In the heating method of honeycomb structure of Example 1 and the heating method of honeycomb structure of Comparative Example 1, the electric energy (kWs) supplied to the honeycomb structure body for 20 seconds from the start time of the heating step was the same. As shown in FIG. 10 and FIG. 12, in Example 1 where the supply power decrease section was provided, the maximum temperature difference of the heating step continuation section was larger as compared with the case of Comparative Example 1, but it was possible to heat the honeycomb structure up to the target temperature in a state where no crack was generated. On the other hand, in Comparative Example 1, the total time of the heating step and the electric energy were the same as in Example 1, but the lowest temperature at the end time of the heating step did not reach the target temperature. That is, in the heating method of honeycomb structure of Comparative Example 1, for allowing the lowest temperature of the honeycomb structure to reach 300° C. which is the target temperature this time, more power is required than in Example 1. In this way, it has been found that eventually in the heating method of honeycomb structure of Example 1, it is possible to allow the honeycomb structure to reach the target temperature in shorter time and with less power.

Furthermore, in the heating method of honeycomb structure of Example 2 and the heating method of honeycomb structure of Comparative Example 2, the electric energy (kWs) supplied to the honeycomb structure body for 20 seconds from the start time of the heating step was the same. In Comparative Example 2, the electric energy supplied to the honeycomb structure body was larger than the electric energy in Comparative Example 1, and hence the lowest temperature at the end time of the heating step reached the target temperature. However, the maximum temperature difference in the heating step continuation section became very large, and cracks were disadvantageously generated in the honeycomb structure body. In the heating method of honeycomb structure of Example 2, similarly to Example 1, the supply power decrease section was provided in ten seconds after the start time of the heating step, and hence it was possible to reduce the maximum temperature difference in the heating step continuation section. Therefore, in the heating method of honeycomb structure of Example 2, it was possible to heat the honeycomb structure up to the target temperature in a state where no crack was generated.

INDUSTRIAL APPLICABILITY

The heating method of honeycomb structure of the present invention can be utilized as a method of heating, up to a predetermined temperature, the honeycomb structure for use in an exhaust gas purification device or the like to purify exhaust gas of a car.

DESCRIPTION OF REFERENCE NUMERALS

1: partition wall, 2: cell, 3: circumferential wall, 4, 204: honeycomb structure body, 5: side surface, 7: catalyst, 11, 211: first end face, 12, 212: second end face, 21, 221: electrode member, 30: power source, 31: wiring line, 100, 200: honeycomb structure, O: center, P, Q: line segment, α: central angle, β: angle formed by the line segment and the line segment, and θ: angle of 0.5 time the central angle.

The invention claimed is:

1. A heating method of a honeycomb structure, the method comprising:
providing a tubular honeycomb structure body having a resistance value that lowers with rising temperature and which has porous partition walls to define and form a plurality of cells which become through channels for a fluid and extend from a first end face to a second end face and a circumferential wall positioned at an outermost circumference, and which is heated by electricity conduction, and a catalyst loaded onto the partition walls of the honeycomb structure body, the method further comprising:
a heating step of supplying a power to the honeycomb structure body of the honeycomb structure to heat the honeycomb structure body up to a target temperature,
wherein in the heating step, there is provided, at least once, a supply power decrease section where the supply of the power to the honeycomb structure body is stopped or the power to be supplied to the honeycomb structure body is decreased before the lowest temperature in a heating region of the honeycomb structure body reaches the target temperature.

2. The heating method of the honeycomb structure according to claim 1, wherein in the heating step, after the supply power decrease section, there is provided a supply power return section where the supply of the power to the honeycomb structure body is restarted or the power to be supplied to the honeycomb structure body is increased from a decreased state.

3. The heating method of the honeycomb structure according to claim 1, wherein in the heating step, the honeycomb structure body is heated until the lowest temperature in the heating region of the honeycomb structure body becomes 100° C. or more.

4. The heating method of the honeycomb structure according to claim 2, wherein in the heating step, the honeycomb structure body is heated until the lowest temperature in the heating region of the honeycomb structure body becomes 100° C. or more.

5. The heating method of the honeycomb structure according to claim 1, wherein in the heating step, the honeycomb structure body is heated so that the highest temperature in the heating region of the honeycomb structure body does not exceed 1000° C.

6. The heating method of the honeycomb structure according to claim 2, wherein in the heating step, the honeycomb structure body is heated so that the highest temperature in the heating region of the honeycomb structure body does not exceed 1000° C.

7. The heating method of the honeycomb structure according to claim 3, wherein in the heating step, the honeycomb structure body is heated so that the highest temperature in the heating region of the honeycomb structure body does not exceed 1000° C.

8. The heating method of the honeycomb structure according to claim 1, wherein in the heating step, a difference between the highest temperature and the lowest temperature in the heating region of the honeycomb structure body is 900° C. or less.

9. The heating method of the honeycomb structure according to claim 2, wherein in the heating step, a difference between the highest temperature and the lowest temperature in the heating region of the honeycomb structure body is 900° C. or less.

10. The heating method of the honeycomb structure according to claim 3, wherein in the heating step, a difference between the highest temperature and the lowest temperature in the heating region of the honeycomb structure body is 900° C. or less.

11. The heating method of the honeycomb structure according to claim 1, wherein the honeycomb structure further comprises two or more electrode members disposed on a side surface of the honeycomb structure body.

12. The heating method of the honeycomb structure according to claim 2, wherein the honeycomb structure further comprises two or more electrode members disposed on a side surface of the honeycomb structure body.

13. The heating method of the honeycomb structure according to claim 3, wherein the honeycomb structure further comprises two or more electrode members disposed on a side surface of the honeycomb structure body.

14. The heating method of the honeycomb structure according to claim 1, wherein in the heating step, the supply power decrease section is provided in a state where at least the highest temperature in the heating region of the honeycomb structure body is a temperature which is not less than the target temperature.

15. The heating method of the honeycomb structure according to claim 2, wherein in the heating step, the supply power decrease section is provided in a state where at least the highest temperature in the heating region of the honeycomb structure body is a temperature which is not less than the target temperature.

16. The heating method of the honeycomb structure according to claim 3, wherein in the heating step, the supply power decrease section is provided in a state where at least the highest temperature in the heating region of the honeycomb structure body is a temperature which is not less than the target temperature.

17. The heating method of the honeycomb structure according to claim 1, wherein in the supply power decrease section, the highest temperature in the heating region of the honeycomb structure body lowers with an elapse of time.

18. The heating method of the honeycomb structure according to claim 2, wherein in the supply power decrease section, the highest temperature in the heating region of the honeycomb structure body lowers with an elapse of time.

19. The heating method of the honeycomb structure according to claim 3, wherein in the supply power decrease section, the highest temperature in the heating region of the honeycomb structure body lowers with an elapse of time.

* * * * *